US010843433B2

(12) United States Patent
Nyeboer

(10) Patent No.: US 10,843,433 B2
(45) Date of Patent: Nov. 24, 2020

(54) FOLDED PANEL, METHOD OF MAKING SAME AND PRODUCTS MADE FROM ONE OR MORE SUCH FOLDED PANELS

(71) Applicant: Bradford Company, Holland, MI (US)

(72) Inventor: Calvin D. Nyeboer, Holland, MI (US)

(73) Assignee: Bradford Company, Holland, MI (US)

( * ) Notice: Subject to any disclaimer, the term of this patent is extended or adjusted under 35 U.S.C. 154(b) by 0 days.

(21) Appl. No.: 16/136,919

(22) Filed: Sep. 20, 2018

(65) Prior Publication Data

US 2019/0091963 A1    Mar. 28, 2019

Related U.S. Application Data

(60) Provisional application No. 62/562,888, filed on Sep. 25, 2017.

(51) Int. Cl.
*B32B 3/04* (2006.01)
*B32B 27/30* (2006.01)
*B32B 27/08* (2006.01)
*B32B 27/12* (2006.01)
*B32B 5/24* (2006.01)
(Continued)

(52) U.S. Cl.
CPC ............... *B32B 3/04* (2013.01); *B32B 1/00* (2013.01); *B32B 5/24* (2013.01); *B32B 7/12* (2013.01); *B32B 27/08* (2013.01); *B32B 27/12* (2013.01); *B32B 27/306* (2013.01); *B32B 37/10* (2013.01);
(Continued)

(58) Field of Classification Search
CPC ...................................................... B29C 53/36
See application file for complete search history.

(56) References Cited

U.S. PATENT DOCUMENTS 5,211,901 A * 5/1993 Fray .................. B29C 53/02
                                                  264/167
5,520,995 A * 5/1996 Fukushima ........... B29B 15/105
                                                  428/216

(Continued)

FOREIGN PATENT DOCUMENTS

EP          2819841 B1       11/2016

OTHER PUBLICATIONS

PCT International Preliminary Report on Patentability, dated Mar. 31, 2020 for PCT/US2018/051970.
(Continued)

*Primary Examiner* — Matthew J Daniels
(74) *Attorney, Agent, or Firm* — Barnes & Thornburg LLP

(57) ABSTRACT

A folded panel includes a fiber-reinforced polymer (FRP) substrate with an outer layer secured to and at least partially covering one major surface thereof and a polymer matrix covering an opposite major surface thereof. In one embodiment, the FRP substrate is folded about a fold line to create opposed plies on either side of the fold line with the polymer matrix of one of the opposed plies contacting the polymer matrix of the other of the opposed plies and with the outer layer forming a folded edge at the fold line that is continuous with the outer layer covering the opposed plies, and the folded FRP substrate is then consolidated with the polymer matrix. In another embodiment, a fiber or fibrous material substrate is positioned between the opposed plies and the combination of the folded FRP substrate and the fiber or fibrous substrate is consolidated with the polymer matrix.

6 Claims, 11 Drawing Sheets

(51) Int. Cl.
   *B32B 7/12*      (2006.01)
   *B32B 1/00*      (2006.01)
   *B32B 37/10*     (2006.01)

(52) U.S. Cl.
   CPC ..... *B32B 2260/021* (2013.01); *B32B 2607/00* (2013.01)

(56) References Cited

U.S. PATENT DOCUMENTS

| | | |
|---|---|---|
| 5,565,056 A | 10/1996 | Lause et al. |
| 6,022,503 A | 2/2000 | Hudkins et al. |
| 7,344,043 B2 | 3/2008 | Nyeboer |
| 7,344,044 B2 | 3/2008 | Bradford et al. |
| 7,878,362 B2 | 2/2011 | Nyeboer |
| 8,079,490 B2 | 12/2011 | Nyeboer et al. |
| 8,100,283 B2 | 1/2012 | Nyeboer et al. |
| 8,460,504 B2 | 6/2013 | Bradford et al. |
| 2002/0151240 A1 | 10/2002 | Smith et al. |
| 2006/0157489 A1* | 7/2006 | Bradford ............... B29C 66/114 220/552 |

OTHER PUBLICATIONS

PCT Written Opinion of the International Searching Authority, dated Mar. 8, 2019 for PCT/US2018/051970.

* cited by examiner

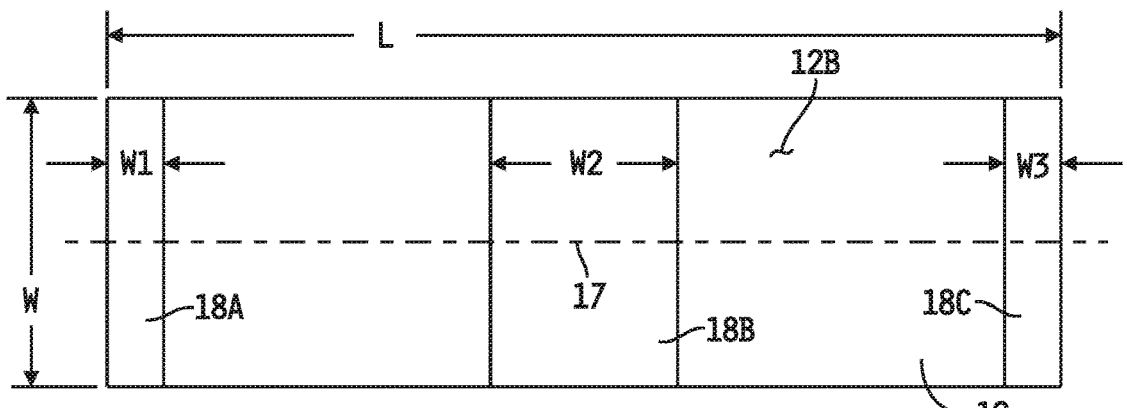
FIG. 6A
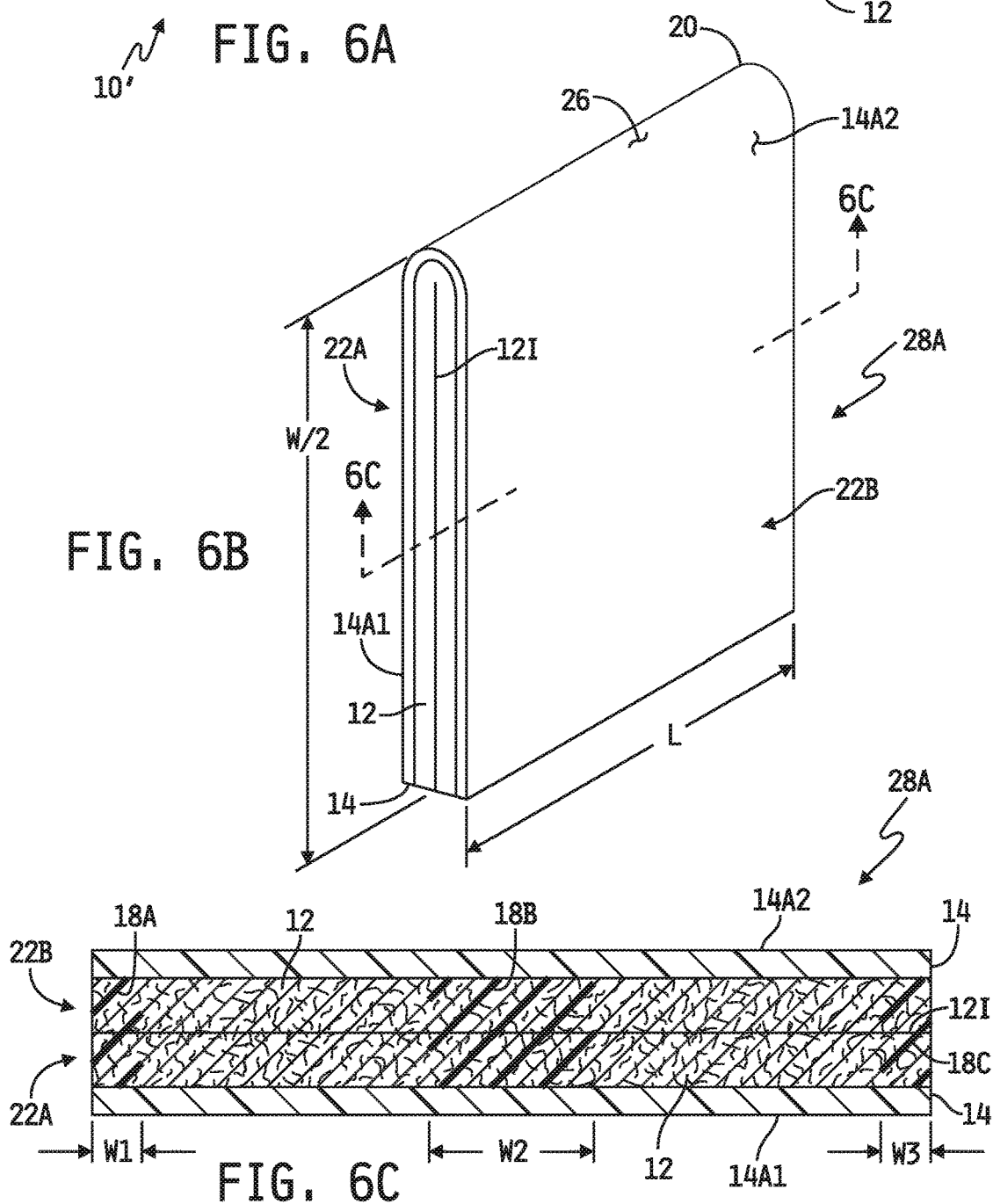
FIG. 6B
FIG. 6C

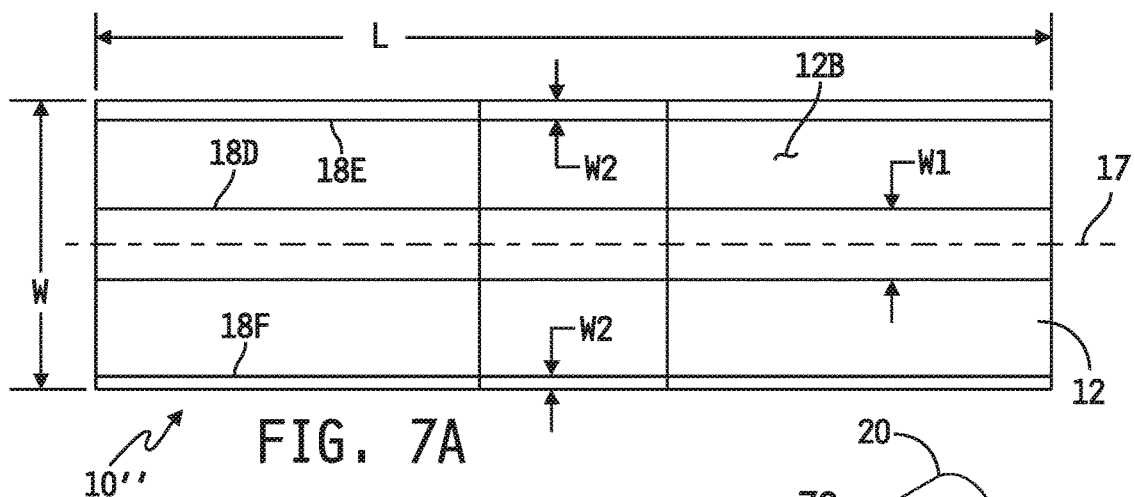
FIG. 7A
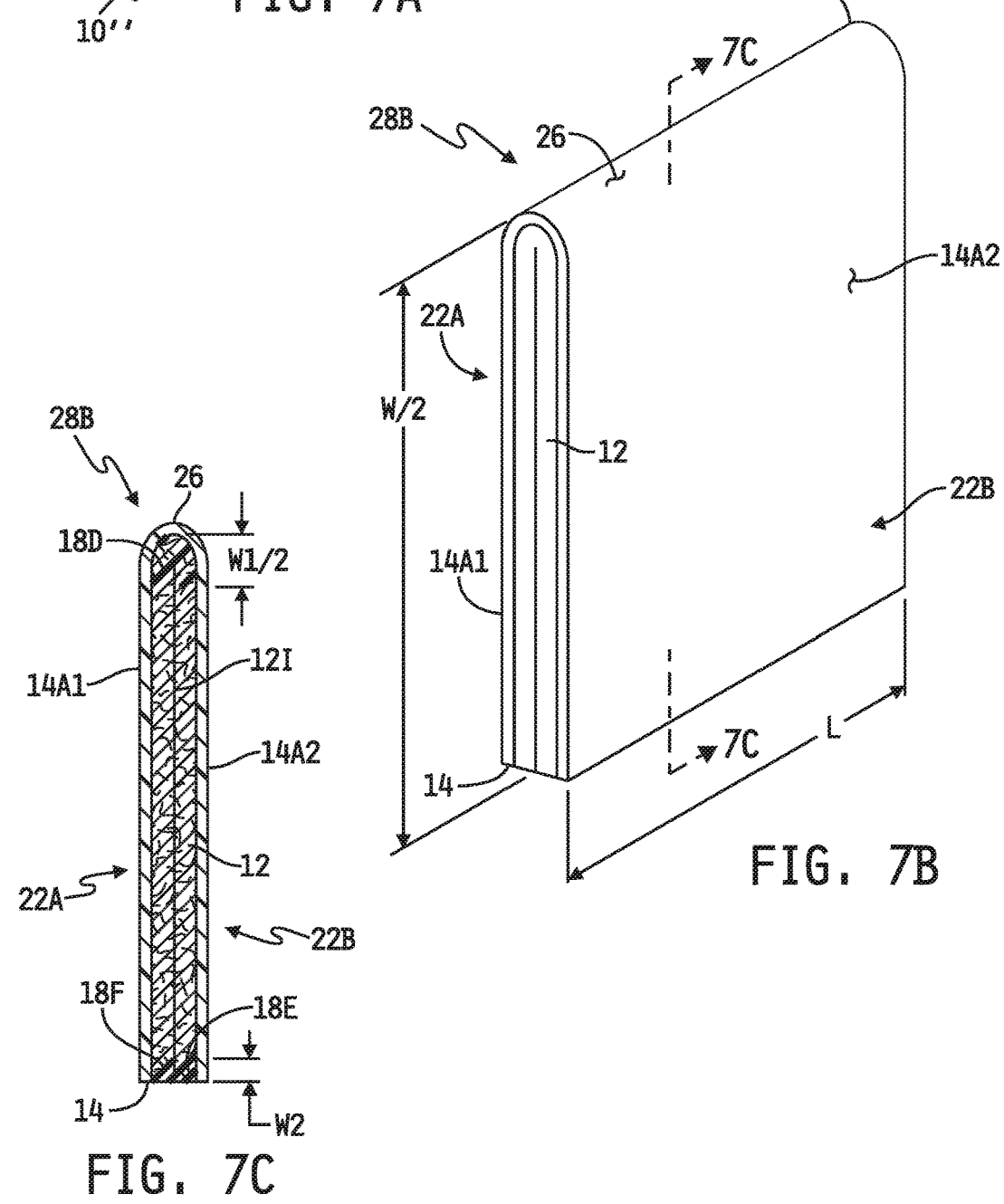
FIG. 7B
FIG. 7C

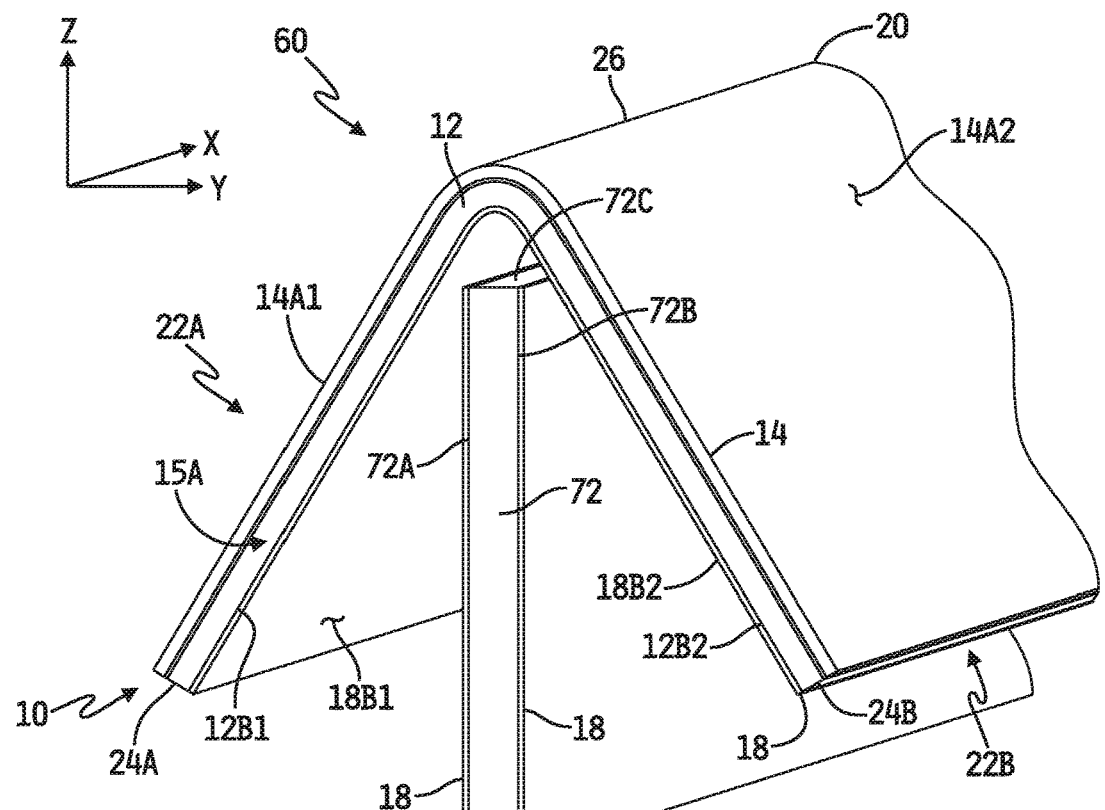
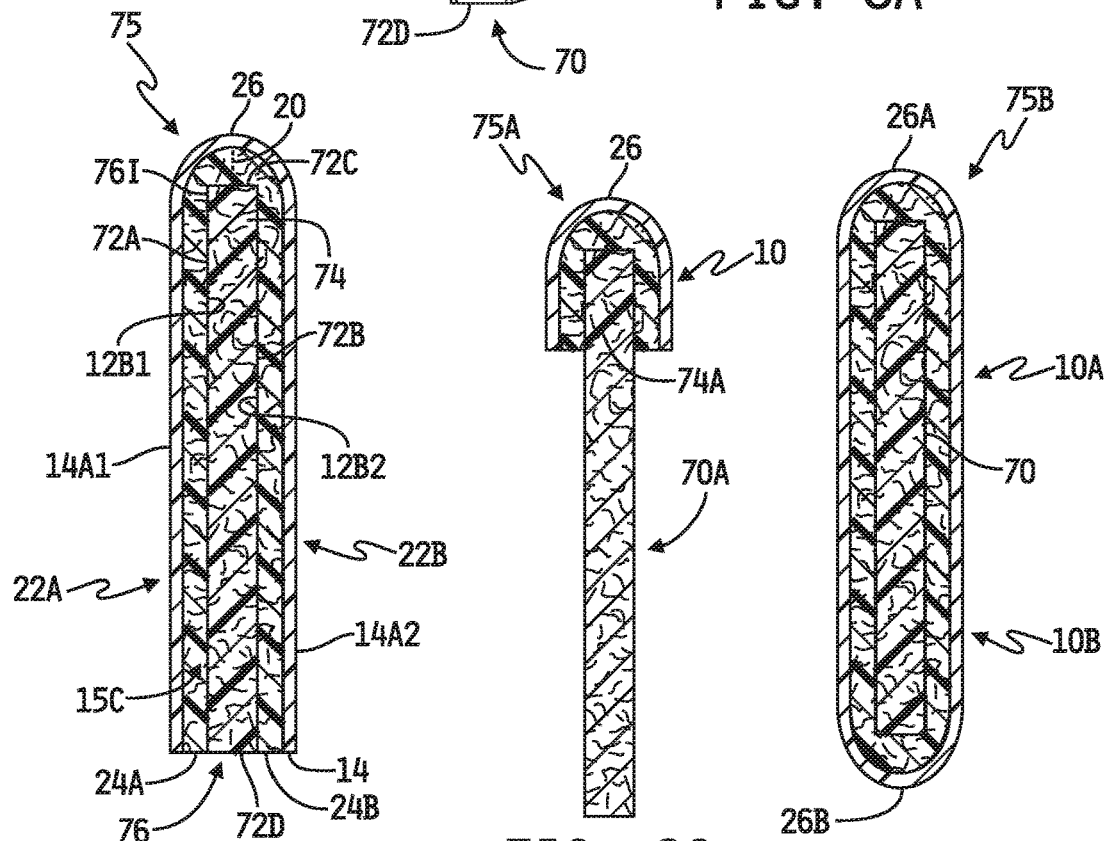
FIG. 8A
FIG. 8B
FIG. 8C
FIG. 8D

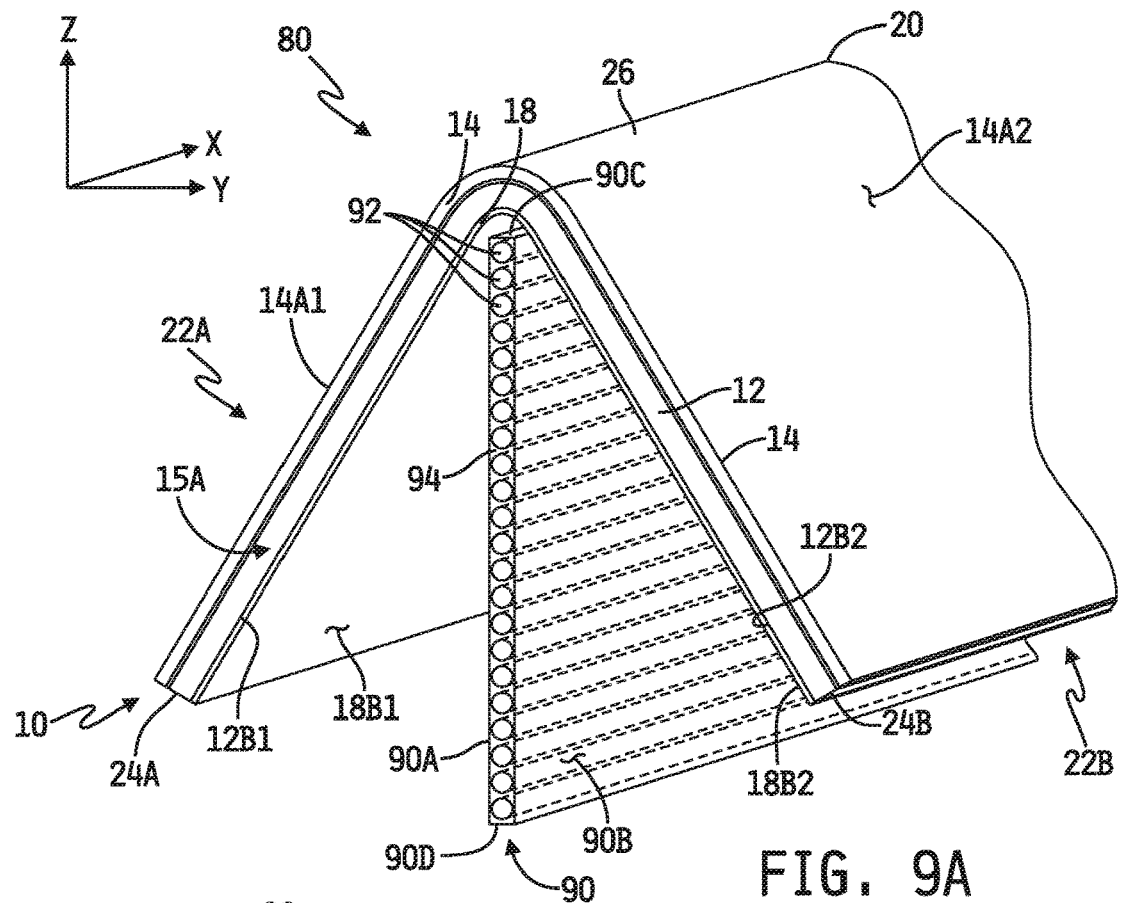
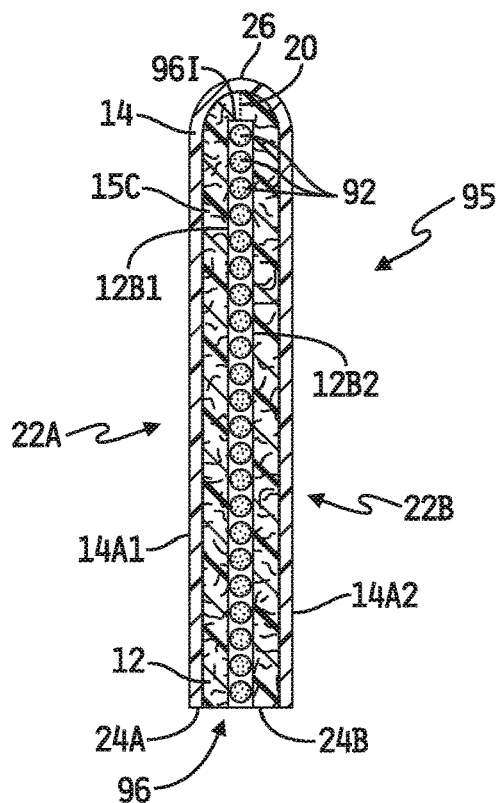
FIG. 9A
FIG. 9B

US 10,843,433 B2
1

FOLDED PANEL, METHOD OF MAKING SAME AND PRODUCTS MADE FROM ONE OR MORE SUCH FOLDED PANELS

CROSS-REFERENCE TO RELATED APPLICATION

This patent application claims the benefit of, and priority to, U.S. Provisional Patent Application Ser. No. 62/562,888, filed Sep. 25, 2017, the disclosure of which is expressly incorporated herein by reference in its entirety.

FIELD OF THE INVENTION

The present invention relates to folded panels, methods of making folded panels, and to products made from one or more such folded panels, examples of which may include, but are not limited to, partitions made from such folded panels and partition assemblies including at least one partition made from such a folded panel.

BACKGROUND

Conventional divider panels divide the interior of a shipping and/or storage container into individual cells sized to hold parts during shipping and/or storage. Many divider panel variants are known, and one particular type of such known divider panels has two-ply foam substrates folded and secured to one another to provide folded edge partitions. Examples of such divider panels are described in U.S. Pat. Nos. 7,344,043, 7,344,044, 7,878,362, 8,079,490, 8,100,283, 8,460,504, all of which are assigned to the assignee of this disclosure and the disclosures of which are all incorporated herein by reference in their entireties.

One drawback associated with such known folded edge panels is a lack of stiffness and/or strength due to the necessarily flexible and cellular foam substrates. Indeed, U.S. Pat. Nos. 7,344,044 and 8,460,504 at least partially address this drawback by providing a floor to which a partition assembly constructed from such panels is secured. U.S. Pat. No. 8,100,283 likewise at least partially addresses this drawback by providing for pockets between the two plies through which rigid connector members may extend. Such lack of stiffness and/or strength also limits other uses of folded panels from which such folded edge partitions are made.

Another drawback associated with such known folded edge panels relates to the complicated manner in which the two plies are welded to one another. Because the substrate is a foam material, it must necessarily be heated at the contacting surfaces followed by bringing the two heated surfaces into contact with one another.

Thus, there exists a need for improvements in the structural aspects and in the fabrication of folded edge panels and partition assemblies including one or more such folded edge panels.

SUMMARY

The present invention may comprise one or more of the features recited in the attached claims, and/or one or more of the following features and combinations thereof. In one aspect, a method of forming a folded panel may one of (a) forming a multi-layer panel by securing an outer layer to a first major surface of a fiber-reinforced polymer (FRP) substrate having a second major surface opposite the first major surface with a polymer matrix at least partially covering the second major surface, and (b) providing the multi-layer panel with the outer layer secured to and at least partially covering the first major surface and with the polymer matrix covering the second major surface of the FRP substrate, folding the multi-layer panel about a fold line to create opposed plies on either side of the fold line with the polymer matrix of one of the opposed plies contacting the polymer matrix of the other of the opposed plies and with the outer layer forming a folded edge at the fold line that is continuous with the outer layer covering the opposed plies, and consolidating the FRP substrate of the folded panel to form a folded, consolidated panel.

In another aspect, a method of forming a folded panel may comprise one of (a) forming a multi-layer panel by securing an outer layer to a first major surface of a fiber-reinforced polymer (FRP) substrate having a second major surface opposite the first major surface with a polymer matrix at least partially covering the second major surface, and (b) providing the multi-layer panel with the outer layer secured to and covering the first major surface and with the polymer matrix at least partially covering the second major surface of the FRP substrate, folding the multi-layer panel about a fold line to create opposed plies on either side of the fold line with the polymer matrix one of the opposed plies facing the polymer matrix of the other of the opposed plies and with the outer layer forming a folded edge at the fold line that is continuous with the outer layer covering the opposed plies, inserting at least one fiber or fibrous material substrate between the opposed plies, the at least one fiber or fibrous substrate having opposed first and second major surfaces each contacting the polymer matrix of a different one of the opposed plies of the folded panel and having a top edge aligned with and adjacent to the fold line, and simultaneously consolidating the combination of the folded FRP substrate and the at least one fiber or fibrous substrate inserted therein to form a folded, consolidated panel.

In yet another aspect, a folded panel may comprise a fiber-reinforced polymer (FRP) substrate having a polymer matrix at least partially covering a first major surface thereof, and an outer layer secured to and covering a second major surface of the FRP substrate opposite the first major surface thereof, wherein the FRP substrate is folded about a fold line to create opposed plies on either side of the fold line with the polymer matrix of one of the opposed plies contacting the polymer matrix of the other of the opposed plies and with the outer layer forming a folded edge at the fold line that is continuous with the outer layer covering the opposed plies, and wherein the folded FRP substrate is consolidated with the polymer matrix to form a folded, consolidated panel.

In a still another aspect, a folded panel may comprise a fiber-reinforced polymer (FRP) substrate having a polymer matrix at least partially covering a first major surface thereof, an outer layer secured to and covering a second major surface of the FRP substrate opposite the first major surface thereof, and at least one fiber or fibrous material substrate having opposed first and second major surfaces, wherein the FRP substrate is folded about a fold line to create opposed plies on either side of the fold line with the outer layer forming a folded edge at the fold line that is continuous with the outer layer covering the opposed plies, the at least one fiber or fibrous material substrate positioned between the opposed plies with opposed first and second major surfaces of the at least one fiber or fibrous substrate each contacting the polymer matrix of a different one of the opposed plies of the folded panel, and wherein the combination of the folded FRP substrate and the at least one fiber or fibrous substrate is consolidated with the polymer matrix to form a folded, consolidated panel.

In a further aspect, a partition assembly may comprise at least one first slotted partition, each first slotted partition having at least one slot extending inwardly from an edge thereof, and at least one second slotted partition, each second slotted partition having at least one slot extending inwardly from an edge thereof, said first and second slotted partitions arranged in a matrix, said at least one slot of said at least one first slotted partition engaging said at least one slot of said at least one second slotted partition at an intersection thereof, at least one of said first and second slotted partitions comprising a fiber-reinforced polymer (FRP) substrate with opposed first and second major surfaces, a polymer matrix secured to and at least partially covering the first major surface thereof and an outer layer secured to and covering the second major surface thereof, and with the FRP substrate folded about a fold line to create opposed plies on either side of the fold line with the outer layer forming a folded edge at the fold line that is continuous with the outer layer covering the opposed plies and with the FRP substrate of the opposed plies consolidated together.

In still a further aspect, a partition assembly may comprise at least one first slotted partition, each first slotted partition having at least one slot extending inwardly from an edge thereof, and at least one second slotted partition, each second slotted partition having at least one slot extending inwardly from an edge thereof, said first and second slotted partitions arranged in a matrix, said at least one slot of said at least one first slotted partition engaging said at least one slot of said at least one second slotted partition at an intersection thereof, at least one of said first and second slotted partitions comprising a fiber-reinforced polymer (FRP) substrate with opposed first and second major surfaces, a polymer matrix secured to and at least partially covering the first major surface thereof and an outer layer secured to and covering the second major surface thereof, and at least one fiber or fibrous material substrate, wherein the FRP substrate is folded about a fold line to create opposed plies on either side of the fold line with the outer layer forming a folded edge at the fold line that is continuous with the outer layer covering the opposed plies and with the at least one fiber or fibrous substrate positioned between opposed plies, the combination of the opposed plies of the FRP substrate and the at least one fiber or fibrous substrate consolidated together.

BRIEF DESCRIPTION OF THE DRAWINGS

FIG. 6A is a simplified diagram illustrating a perspective view of another embodiment of a panel prior to processing to form a folded panel and shown with an example set of polymer matrix zones applied thereon.

FIG. 6B is a simplified diagram illustrating a perspective view of the panel of FIG. 6A shown after the panel is folded and consolidated.

FIG. 6C is a cross-sectional view of the folded, consolidated panel depicted in FIG. 6B as viewed along the section lines 6C-6C.

FIG. 7A is a simplified diagram illustrating a perspective view of yet another embodiment of a panel prior to processing to form a folded panel and shown with another example set of polymer matrix zones applied thereon.

FIG. 7B is a simplified diagram illustrating a perspective view of the panel of FIG. 7A shown after the panel is folded and consolidated.

FIG. 7C is a cross-sectional view of the folded, consolidated panel depicted in FIG. 7B as viewed along the section lines 7C-7C FIG. 8A is a simplified diagram illustrating a perspective view of another embodiment of a folded panel.

FIG. 8B is a cross-sectional view similar to FIGS. 5C and 7C, and showing the folded panel of FIG. 8A after processing to consolidate the combination of the plies of the folded panel and a fiber or fibrous material substrate inserted therebetween.

FIG. 8C is a cross-sectional view similar to FIG. 8B and showing another embodiment of a folded panel after processing to consolidate a combination of the plies of a folded panel and a fiber or fibrous material substrate inserted therein.

FIG. 8D is a cross-sectional view similar to FIG. 8B and showing yet another embodiment of a folded panel after processing to consolidate a combination of the plies of two folded panels disposed end-to-end and a fiber or fibrous material substrate inserted therein.

FIG. 9A is a simplified diagram illustrating a perspective view of yet another embodiment of a folded panel.

FIG. 9B is a cross-sectional view similar to FIGS. 5C, 7C and 8C, and showing the folded panel of FIG. 9A after processing to consolidate the combination of the plies of the folded panel and an oriented fiber substrate inserted therebetween.

DESCRIPTION OF THE ILLUSTRATIVE EMBODIMENTS

Figure 1:
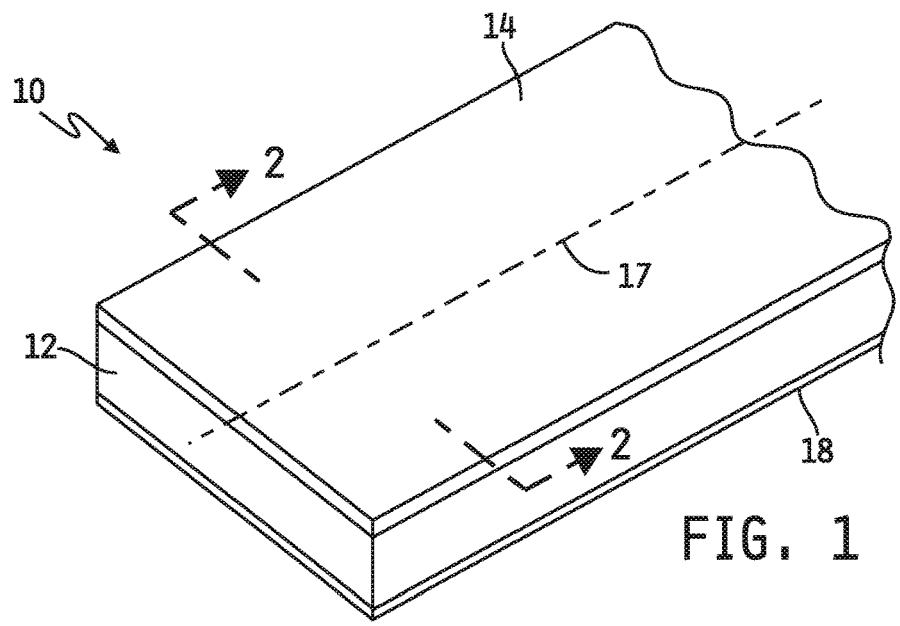
FIG. 1 is a simplified diagram illustrating a perspective view of an embodiment of a panel prior to processing to form a folded panel in accordance with this disclosure.

For the purposes of promoting an understanding of the principles of this disclosure, reference will now be made to a number of illustrative embodiments shown in the attached drawings and specific language will be used to describe the same. In this regard, certain terms and phrases used in this disclosure shall be understood to have the following meanings. The term "fiber reinforced polymer substrate" or "FRP substrate," for example, is defined as a composite substrate made up of a polymer matrix reinforced with fibers or with a fibrous material. For purposes of this disclosure, the term FRP substrate shall be understood to be or include either one or a combination of a so-called "pre-preg substrate" made up of fibers or a fibrous material that has been pre-impregnated with a polymer matrix, and a so-called "dry substrate" made up of fibers or a fibrous material to which the polymer matrix is subsequently applied. In either case, the fibers or fibrous material may be or include one or any combination of conventional organic or synthetic fibers, examples of which include, but are not limited to, glass, carbon, aramid, basalt, cellulose, and the like. It will be further understood that, for purposes of this disclosure, all phrases recited in the attached claims in the general form "at least one of A and B" are intended to be interpreted as only A, only B or a combination of A and B.

As described in greater detail below, external energy is applied to the FRP substrate during processing thereof in accordance with this disclosure to "consolidate" the FRP substrate. In this context, the terms "consolidate" and "consolidation" will be understood to mean a process which "activates" the polymer matrix and causes the activated polymer matrix to infuse into the fiber or fibrous material substrate. The term "activate," as used herein to modify the phrase "polymer matrix," will be understood to mean application of external energy to the FRP substrate so as to lower the viscosity of the polymer matrix sufficiently to cause the activated polymer matrix to flow and wet the fiber or fibrous material substrate during the consolidation process.

In some embodiments, the polymer matrix may be provided in the form of a conventional thermoset resin. In some such embodiments, the external energy applied to consolidate the FRP substrate is illustratively supplied in the form of heat and compression in which the former activates the thermoset resin and the latter causes the activated thermoset resin to flow into, i.e., penetrate, the fiber or fibrous material substrate and wet the fibers. In such embodiments, the thermoset resin irreversibly cures in a conventional manner during the consolidation process to form a rigid or semi-rigid FRP substrate. As is generally known, cured thermoset resin cannot thereafter be reactivated by application of external energy. In other embodiments, the polymer matrix may be provided in the form of a conventional thermoplastic matrix. In some such embodiments, the external energy applied to consolidate the FRP substrate is likewise illustratively supplied in the form of heat and compression. In such embodiments, consolidation of the FRP substrate illustratively further requires a conventional cooling process to allow the thermoplastic matrix to harden to form the rigid or semi-rigid FRP substrate. Thereafter, the thermoplastic matrix may be reactivated by application of external energy. In any such embodiment(s), activation of the polymer matrix by application of heat will be understood to mean heating the polymer matrix to a temperature which lowers the viscosity of the polymer matrix sufficiently to cause the heated polymer matrix to flow into and wet the fiber or fibrous material substrate. Furthermore, it will be understood that the term "pre-preg substrate," as used herein, may refer interchangeably to an uncured FRP substrate and a partially-cured, or so-called B-stage FRP substrate in which the FRP substrate is only partially consolidated, i.e., in which the polymer matrix layer is only partially cured. The terms thermoset and thermoplastic should be understood in accordance with their respective ordinary meanings. In some embodiments, the polymer matrix may be provided in the form of any conventional thermoset or thermoplastic medium. One non-limiting example of the latter may be or include a conventional polyvinyl acetate or polyethenyl ethanoate, e.g., commonly known as white glue, wood glue, carpenter's glue or school glue. Other polymer matrix compositions will occur to those skilled in the art, and it will be understood that any such polymer compositions are intended to fall within the scope of this disclosure.

In some embodiments, the fibers or fibrous material may be or include oriented fibers, and in other embodiments the fibers or fibrous material may be or include non-oriented fibers, e.g., randomly or pseudo-randomly, or a combination of oriented and non-oriented fibers. In embodiments which include oriented fibers, such fibers may be one-dimensional so as to align with each other along a single direction, i.e., such that the fibers run parallel with each other. In some alternate embodiments which include oriented fibers, the oriented fibers may be two-dimensional such that some of the fibers align with each other along one direction and others of the fibers align with each other along a different direction. In some embodiments, the two directions may be perpendicular to each other, and in other embodiments the two directions may be non-perpendicular. In still other alternate embodiments which include oriented fibers, the oriented fibers may be three-dimensional so as to incorporate fibers aligned with each other along three different directions. In some embodiments which include fibers with differing orientations, some or all such fibers may be interwoven with each other, and in other such embodiments fibers with different orientations may be non-woven. Whether oriented or non-oriented, some or all of the fibers in some embodiments may be continuous, i.e., may extend continuously as single, unitary members from one border of the substrate to another, and in other embodiments some or all of the fibers may be non-continuous, i.e., may not fully extend between borders of the substrate.

Figure 2:
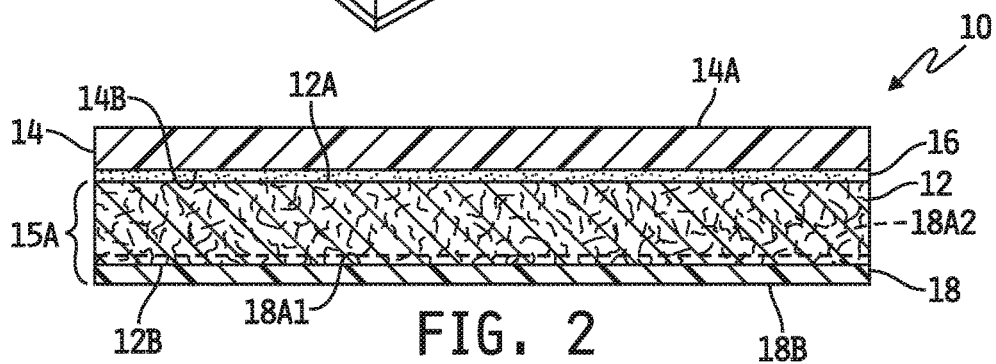
FIG. 2 is a cross-sectional view of the panel of FIG. 1 as viewed along section lines 2-2.

This disclosure is directed to apparatuses and methods for processing FRP substrates to form folded, consolidated panels, and to products made from one or more such folded, consolidated panels. Example products that may be made from one or more such folded, consolidate panels include, but are not limited to, sides, tops and/or bottoms of product shipping and/or storage containers, containers made therefrom, dividers for rigid, semi-rigid or flexible product storage and/or shipping containers, slotted or un-slotted partitions, partition assemblies made from one or more such slotted and/or un-slotted partitions, and the like. Referring now to FIGS. 1 and 2, an embodiment is shown of a panel 10 prior to processing thereof to form a folded and consolidated panel. In the illustrated embodiment, the panel 10 includes an elongated, unconsolidated FRP substrate 15A made up of a fiber or fibrous substrate 12 having opposed major surfaces 12A, 12B, and a polymer matrix 18 covering the inner major surface 12B thereof. In some embodiments, e.g., in which the unconsolidated FRP substrate 15A represents a completely uncured FRP substrate, the inner major surface 18A1 of the polymer matrix 18 is secured to the inner major surface 12B of the fiber or fibrous substrate 12 as illustrated by example in FIG. 2. In other embodiments, e.g., in which the unconsolidated FRP substrate 15 represents a B-stage FRP substrate, the partially-cured polymer matrix 18 may be at least partially infused into the fiber or fibrous substrate 12 to form an embedded interface 18A2 with the fiber or fibrous substrate 12 as illustrated by dashed-line representation in FIG. 2. The term "unconsolidated FRP substrate," as just used above and as will be further used herein, may thus refer interchangeably to a completely uncured FRP substrate or a B-stage FRP substrate.

In the illustrated embodiment, an outer layer or skin 14 is secured to and covers the outer major surface 12A of the fiber or fibrous substrate 12. The outer layer or skin 14 has opposed major surfaces 14A, 14B, and in the illustrated embodiment an inner major surface 14B of the outer layer 14 is shown secured to the outer major surface 12A of the substrate 12 via a bonding medium 16. In some embodiments, the bonding medium 16 may be a conventional adhesive layer 16, e.g., a conventional thermally activated adhesive, although it will be understood that the bonding medium 16 may alternatively represent other types of adhesives or other conventional bonding media for securing the inner major surface 14B of the outer layer 14 to the outer major surface 12A of the fiber or fibrous substrate 12. In some embodiments, depending upon the choice of material for the outer layer or skin 14, the bonding medium 16 may be selected so as to infuse into the outer layer or skin 14 and/or to allow infusion of the polymer matrix 18 into the outer layer or skin 14 during consolidation of the FRP substrate 15A, and in other embodiments the adhesive or bonding medium 16 may be selected to act as a dam to inhibit or block penetration of the polymer matrix 18 into the outer layer or skin 14 during consolidation of the FRP substrate 15A.

Figure 3:
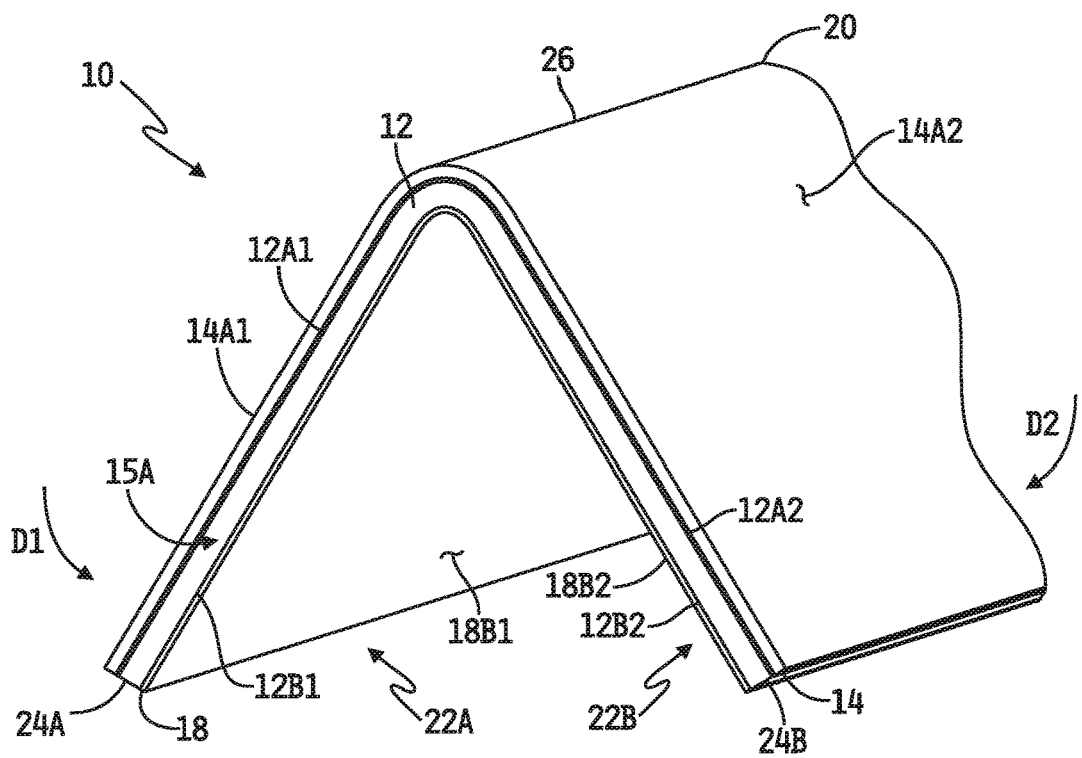
FIG. 3 is a simplified diagram illustrating a perspective view of the panel of FIGS. 1 and 2 shown folded along a longitudinal fold line.

Referring now to FIGS. 3-5C, a process is shown for forming a folded, consolidated panel from the panel 10 illustrated in FIGS. 1 and 2. As shown by example in FIG. 3, the panel 10 is illustratively folded along a fold line 20 into two opposing plies 22A, 22B each on opposite sides of the fold line 20, as illustrated graphically by the directional arrows D1 and D2. In one embodiment, the fold line 26 is illustratively formed at or near a longitudinal line 17 that bisects the panel 10 as illustrated in FIG. 1 such that the free ends 24A 24B of the respective opposed plies 22A, 22B together form one co-planar end or edge 30 of the completed folded, consolidated panel 28 (see, e.g., FIG. 5B). In other embodiments, the fold line 20 may be formed at other locations such that the two free ends of the folded panel 10 are not co-planar, and the panel 10 may then be cut or trimmed appropriately to form the co-planar edge 30. In still other embodiments, the panel 10 may be cut or trimmed appropriately to form the co-planar edge 30 regardless of whether or not the fold line 20 bisects the panel 10. In any case, folding of the panel 10 as illustrated in FIG. 3 results in the portion 18B1 of the polymer matrix layer 18 secured to the portion 12B1 of the inner major surface 12B of the ply 22A facing the portion 18B2 of the polymer layer 18 secured to the portion 12B2 of the inner major surface 12B of the ply 22B, and further results in the outer major surface 14A of the outer layer or skin 14 forming a folded edge 26 at the fold line 20 that is continuous with the portion 14A1 of the outer surface 14A of the outer layer or skin 14 secured to and covering the portion 12A1 of the outer surface 12A of the fiber or fibrous substrate 12 which forms the ply 22A and also with the portion 14A2 of the outer surface 14A of the outer layer or skin 14 secured to and covering the portion 12A2 of the outer surface 12A of the fiber or fibrous substrate 12 which forms ply 22B. As such, the inner, polymer matrix-covered face of the ply 22A faces the inner, polymer matrix covered face of the ply 22B when the panel 10 is folded about the fold line 20 as illustrated in FIG. 3.

Figure 4:
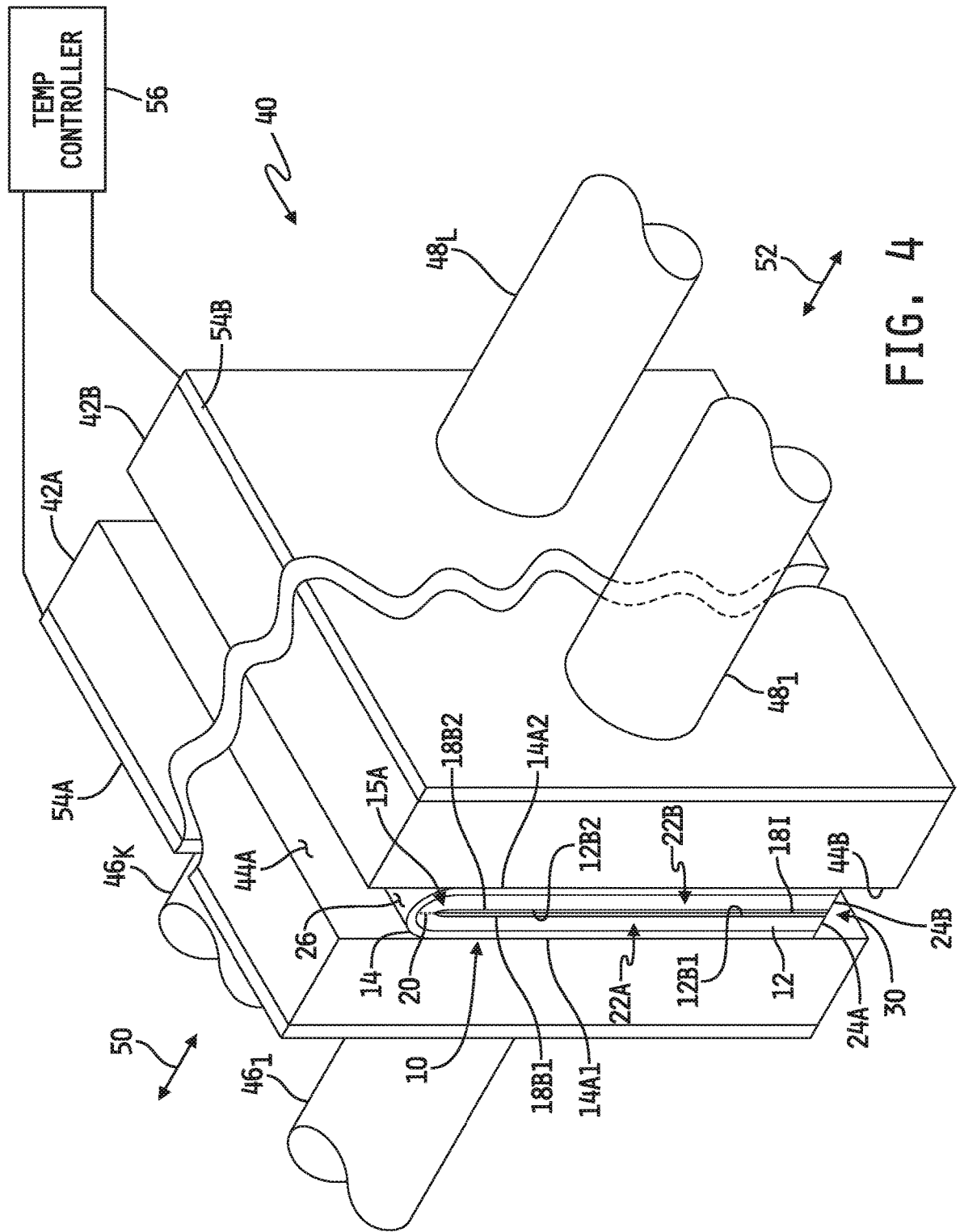
FIG. 4 is a simplified diagram illustrating a perspective view of an apparatus for consolidating the two plies of the folded panel illustrated in FIG. 3.

Referring now to FIG. 4, the folded panel 10 is shown being compressed between inner surfaces 44A, 44B of two respective plates 42A, 42B (or rollers or other conventional press structures) of a conventional press 40 so as to cause the exposed surface 18B1 of the portion of the polymer layer 18 secured to the inner major surface 12B1 of the fiber or fibrous substrate 12 of the ply 22A to contact the exposed surface 18B2 of the portion of the polymer layer 18 secured to the inner major surface 12B2 of the fiber or fibrous substrate 12 of the ply 22B. In the illustrated embodiment, the opposed plates 42A, 42B of the press 40 contact the outer surfaces 14A1, 14A2 respectively of the skin 14 of the folded panel 10 as shown. One or more rods $46_1$-$46_K$ (where K may be any integer) extending outwardly from the plate 42A and joined thereto, and one or more rods $48_1$-$48_L$ (where L may be any integer) extending outwardly from the plate 42B, cause the plates 42A, 42B to move toward and away from each other in a conventional manner as illustrated by the directional arrows 50 and 52. In alternate embodiments, one of the plates 42A, 42B may be stationary and provide a support surface toward and away from the other of the plates 42A, 42B is movable. In any case, with the folded panel 10 inserted between the plates 42A, 42B, the plate 42A and/or the plate 42B is advanced toward the other to push the opposed plies 22A, 22B of the folded panel 10 together about the fold line 20 until the exposed surface 18B1 of the portion of the polymer layer 18 secured to the inner major surface 12B1 of the fiber or fibrous substrate 12 of the ply 22A contacts the exposed surface 18B2 of the portion of the polymer layer 18 secured to the inner major surface 12B2 of the fiber or fibrous material 12 of the ply 22B so as to create a polymer layer interface 18I therebetween as illustrated in FIG. 4.

In the embodiment illustrated in FIG. 4, the plates 42A, 42B of the press 40 are outfitted with conventional heating elements 54A, 54B respectively which are electrically connected to a temperature controller 56, e.g., in the form of a conventional processor or other conventional control circuitry. In the illustrated embodiment, the temperature controller 56 includes or is coupled to a conventional memory unit having instructions stored therein which, when executed by the controller 56, control the heating elements 54A, 54B to a programmed or selectable temperature, thereby controlling the plates 42A, 42B to the programmed or a selectable temperature. In some alternate embodiments, only one of the plates 42A, 42B may be outfitted with a heating element 54A, 54B respectively. In any case, the temperature(s) of the plate(s) 42A and/or 42B is illustratively controlled to a temperature at which heat passing from the plate(s) 42A and/or 42B through the outer layer 14, bonding layer 16 and fiber or fibrous substrate 12 to the polymer layer 18 activates the polymer matrix to a sufficiently low viscosity to cause it to flow, and the compression applied by the plates 42A, 42B to the outer surfaces 14A1, 14A2 of the folded panel 10 is illustratively controlled to a pressure sufficient to cause the activated polymer matrix 18 to flow into and wet the fibers of the fiber or fibrous substrate 12. In embodiments in which the polymer matrix 18 is a conventional thermoset polymer, the above-described process results in curing or consolidation of the FRP substrate. In embodiments in which the polymer matrix 18 is a conventional thermoplastic polymer, consolidation of the FRP substrate further requires a conventional cooling step or stage to set the polymer matrix. In either case, the ply 22A of the consolidated FRP substrate is secured to the ply 22B at or adjacent to the interface of inner major surface 12B1 of the fiber or fibrous substrate 12 and the inner major surface 12B2 of the fiber or fibrous material 12 of the ply 22B.

Figure 5A:
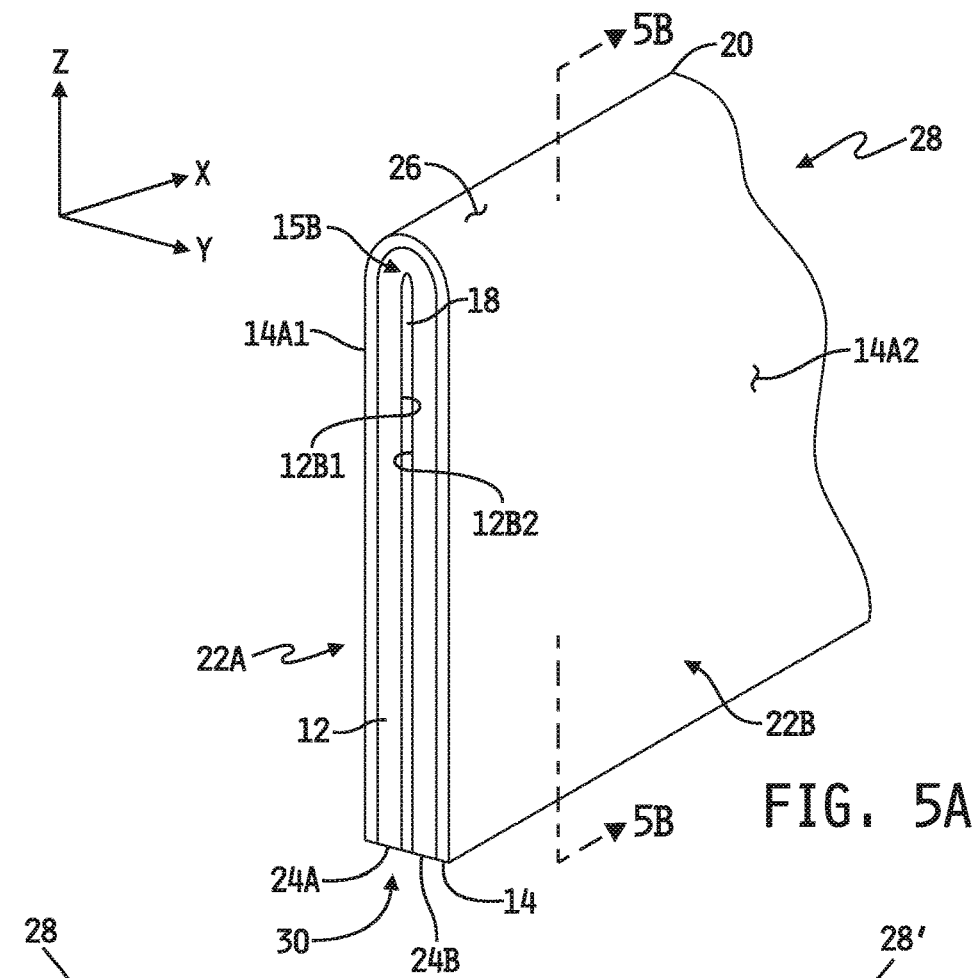
FIG. 5A is a simplified diagram illustrating a perspective view of one version of the folded panel of FIG. 3 after processing by the apparatus of FIG. 4.
Figure 5B:
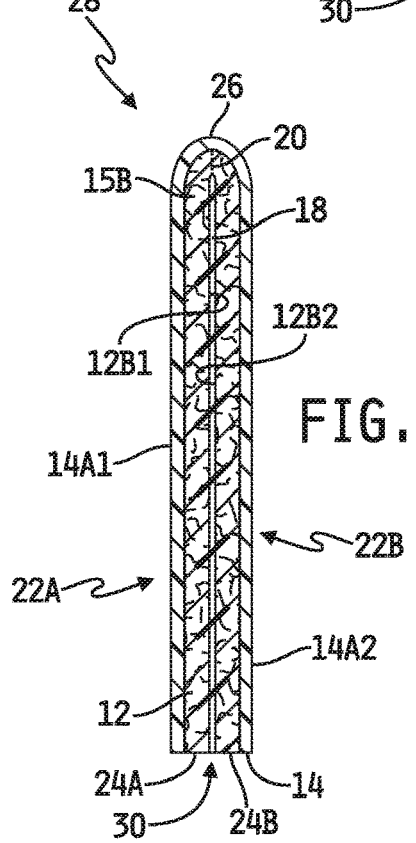
FIG. 5B is a cross-sectional view of the processed folded panel of FIG. 5A as viewed along section lines 5B-5B.
Figure 5C:
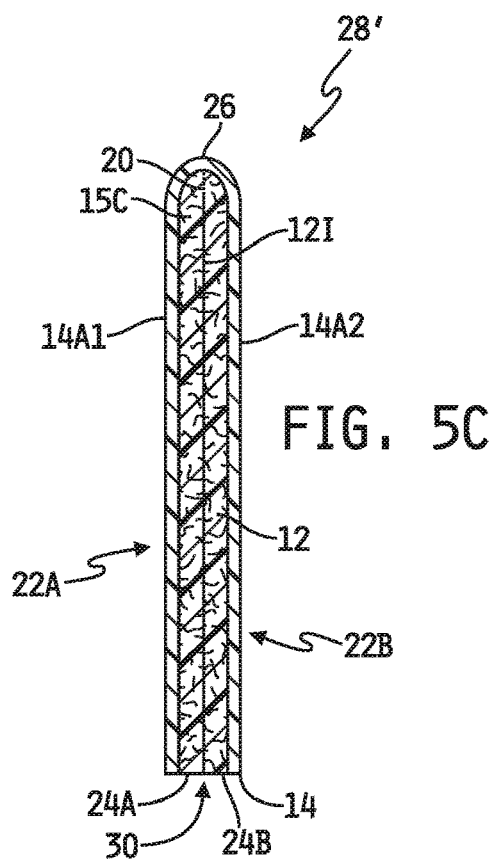
FIG. 5C is a cross-sectional view similar to FIG. 5B and illustrating another version of the folded panel of FIG. 3 after processing by the apparatus of FIG. 4.

In some embodiments of the consolidated FRP substrate, the activated polymer matrix 18 may not infuse completely into the fiber or fibrous substrate 12 during the consolidation process illustrated in FIG. 4. This is illustrated graphically in the resulting folded, consolidated panel 28 shown in FIG. 5B in which the thick cross-section lines depicting the polymer matrix 18 in the consolidated FRP substrate 15B do not extend fully outwardly to the interface between the fiber or fibrous substrate 12 and the outer skin 14. In some such embodiments, some residual amount of the polymer matrix 18 that has not infused into the fiber or fibrous substrate 12 may remain in the interface between the inner major surface 12B1 of the fiber or fibrous substrate 12 of the ply 22A and the inner major surface 12B2 of the fiber or fibrous material 12 of the ply 22B as illustrated in FIGS. 5A and 5B, and in other such embodiments little or no such residual amount of polymer matrix 18 may remain in the interface even though the activated polymer matrix 18 has not infused completely into the substrate 12 as depicted in FIG. 5B. In other embodiments of the consolidated FRP substrate, the activated polymer matrix 18 completely or nearly completely infuses into the fiber or fibrous substrate 12. This is illustrated graphically in the resulting folded, consolidated panel 28' shown in FIG. 5C in which the thick cross-section lines depicting the polymer matrix 18 in the consolidated FRP substrate 15C extend fully outwardly to the interface between the fiber or fibrous substrate 12 and the outer skin 14. In some such embodiments, little or no residual amount of polymer matrix 18 may remain in the interface 12I between the inner major surface 12B1 of the fiber or fibrous substrate 12 of the ply 22A and the inner major surface 12B2 of the fiber or fibrous material 12 of the ply 22B as depicted in FIG. 5C, although in other such embodiments some residual amount of the polymer matrix 18 that has not infused into the fiber or fibrous substrate 12 may remain in this interface. In either case, however, it is to be understood that the consolidation process does not bond or weld the opposing polymer matrix surfaces 18B1, 18B2 together; rather, the consolidation process unitarizes the polymer matrix 18 within the consolidated FRP substrate 15B, 15C as depicted in each of FIGS. 5B and 5C.

As illustrated by example in FIGS. 5A-5C, the consolidated FRP substrate 15B, 15C and the outer layer or skin 14 together assume a generally inverted U-shaped configuration when the panel 10 is folded and the FRP substrate 15A is consolidated to form the folded, consolidated panel 28, 28'. The folded, consolidated panel 28, 28' may illustratively have any desired length, i.e., in the X-direction illustrated in FIG. 5A, any desired height, i.e., in the Z-direction illustrated in FIG. 5A and any desired width or thickness, i.e., in the Y-direction illustrated in FIG. 5A. It will be understood that the width or thickness of the resulting folded, consolidated panel 28, 28', as well as the strength and/or stiffness of the resulting folded, consolidated panel 28, 28', will generally depend on the type, configuration and/or thickness of the FRP substrate 12 used. In one example implementation, which should not be considered limiting in any way, the thickness of the resulting folded, consolidated panel 28, 28' is in the range of approximately 0.5 mm to approximately 2.0 mm, although it will be understood that thinner and thicker resulting folded, consolidated panels are contemplated by this disclosure. It will also be understood that the folded, consolidated panel 28, 28' need not be linear along its length or height as illustrated in FIGS. 5A-5C, and that the structure(s) used to apply energy to the folded panel 10 during the consolidation process may alternatively be shaped or otherwise configured to produce the folded, consolidated panel 28, 28' that is non-linear along its length and/or height.

In the process of forming the folded, consolidated panel 28, 28' just described, at least one of the outer surfaces 14A1, 14A2 of the outer layer or skin 14 is heated to a sufficiently high temperature to activate the polymer matrix 18 carried by the fiber or fibrous substrate 12. In this regard, the outer layer 14 is illustratively made of a material having a melting point that is higher than the temperature to which the outer layer 14 or skin is raised during the consolidation process just described so not to damage, displace or otherwise alter the integrity of the outer layer or skin 14 during the consolidation process. In some embodiments, as described above, the bonding medium 16 acts as a dam to inhibit or prevent the activated polymer matrix 18 from flowing into the outer layer or skin 14, and in such embodiments the bonding medium 16 is illustratively made of a material or composition having a melting or destruction temperature that is higher than the temperature to which the bonding medium 16 will be raised during the consolidation process just described so as not to damage, displace or otherwise alter the integrity of the bonding layer 16 during the consolidation process. In other embodiments, as also described above, the bonding medium 16 may be selected so as to infuse into the outer layer or skin 14 and/or to allow infusion of the polymer matrix 18 into the outer layer or skin 14 during consolidation of the FRP substrate 15A, and in such embodiments the bonding medium 16 is illustratively made of a material or composition having a melting temperature that is the same as or less than that to which the bonding medium 16 will be raised during the consolidation process just described. In one example embodiment, the material used for the outer layer or skin 14 may be, but is not limited to, woven, e.g., brushed, or non-woven polyesters. Those skilled in the art will recognize other conventional materials that may be used as the outer layer 14 so long as the melting temperature of the outer layer is sufficiently higher than that to which the outer layer or skin 14 will be raised during the consolidation process. Additional example materials from which the outer layer or skin 14 may be formed include, but are not limited to, polypropylenes, polyolefins, latex, non-polyolefin plastics, and the like.

As just described in accordance with an example embodiment, a folded, consolidated panel may illustratively be formed by folding a panel 10, comprising an outer skin 14 secured to an outer surface of an FRP substrate 12, 180 degrees onto itself so that the opposing inner surfaces of the folded FRP substrate 12 face or overlay one another, and then applying energy to the outer skin 14 of one or both plies 22A, 22B of the folded panel 10 with the opposing inner surfaces of the folded FRP substrate 12 in contact with one another to consolidate the FRP substrate 12 to produce the folded, consolidated panel. In the embodiment described with respect to FIGS. 3-5C, the energy is illustratively provided in the form of heat of sufficient magnitude applied to the outer skin 14 of one or both of the plies 22A, 22B of the folded panel 10 to activate the polymer matrix 18, and a compressive force of sufficient magnitude also applied to the outer skin 14 of one or both of the plies 22A, 22B of the folded panel 10 to force the opposing inner surfaces of the folded FRP substrate 12 against one another to cause the activated polymer matrix 18 to penetrate or infuse into the FRP substrate 12 and we the fibers contained therein. It will be understood that while such heat is illustrated by example in FIG. 4 as being provided in the form of one or more heating elements 54A, 54B coupled to or carried by either or both of the press plates 42A, 42B, this disclosure contemplates supplying such heat to the outer skin 14 of one or both plies 22A, 22B of the folded panel 10 via one or any combination of any conventional source of conductive, convective or radiative heat. It will also be understood that while such compressive force is illustrated by example in FIG. 4 as being supplied by one or both of a pair of opposing press plates 42A, 42B, this disclosure contemplates supplying such compressive force to the outer skin 14 of one or both plies 22A, 22B of the folded panel 10 via one or a combination of any conventional compression device or system, examples of which may include, but are not limited to, one or more rollers (heated or unheated), a vacuum device or system, one or more resilient members, and the like. Moreover, it will be understood that any conventional method of cooling the resulting folded, consolidated panel 28, 28', in embodiments which may include a cooling step or stage, may be used.

In the embodiment illustrated in FIGS. 1-5C, the polymer matrix 18 is shown and described as covering the entirety of the inner surface 12B of the fiber or fibrous material substrate 12. In alternative embodiments, the polymer matrix 18 may be applied only to selected portions of the inner surface 12B of the fiber or fibrous material substrate 12 with other portions. As one example, which should not be considered limiting, the polymer matrix 18 may be periodically applied in spots to form a matrix of such periodic spots across the length and width of the panel 10, wherein such spots may or may not align with one another when the panel 10 is folded as illustrated in FIG. 3. As a corollary example, which should likewise not be considered limiting, the polymer matrix 18 may be applied such that voids are periodically defined in the polymer matrix 18 across the length and/or width of the panel 10, wherein such voids may or may not align with one another when the panel 10 is folded as illustrated in FIG. 3. As another example, which should also not be considered limiting, the polymer matrix 18 may be selectively applied to the inner surface 12B of the panel 10 to define one or more zones of the polymer matrix 18.

One specific example of such zoned coverage of the polymer matrix 18 is illustrated in FIGS. 6A-6C, wherein three zones 18A, 18B, 18C of the polymer matrix 18 are applied in spaced-apart strips to a panel 10' having a length L and a width W, wherein the panel 10' is to be folded about the longitudinal line 17 and consolidated as described above to form a folded, consolidated panel 28A of length L and width W/2. In the illustrated example, the zone 18A extends across the width W of the panel 10' adjacent to one end thereof in the form of a strip having width W1, the zone 18C extends across the width W of the panel 10' adjacent to an opposite end thereof in the form of a strip of width W3, and the zone 18B extends across the width W of the panel 10' in the form of a strip of width W2 positioned between and spaced apart from the strips 18A, 18C such that none of the polymer matrix 18 covers the inner surface 12B of the fiber or fibrous substrate 12 between the zones 18A, 18B and between the zones 18B, 18C. When the panel 10' is folded about the longitudinal line 17 illustrated in FIG. 6A, the two opposing faces of each of the zones 18A, 18B, 18C are brought into contact with each other and, following consolidation of the panel 28A, each of the zones 18A, 18B, 18C represents a corresponding consolidated zone of the resulting folded, consolidated panel 28A as graphically depicted in FIG. 6C by the thick section lines representing the polymer matrix 18. Between the zones 18A, 18B, 18C the fiber or fibrous substrate 12 is not consolidated, and the two opposing inner surfaces of the fiber or fibrous substrate 12 between such zones 18A, 18B and 18B, 18C are not otherwise affixed or otherwise secured to each other. Additionally, whereas the areas of the folded, consolidated panel 28A defined by the zones 18A, 18B, 18C are rigid or at least semi-rigid as a result of the cured polymer matrix 18 infused in such zones, the areas between the zones 18A, 18B, 18C retain the flexibility defined by the fiber or fibrous substrate 12.

Another specific example of such zoned coverage of the polymer matrix 18 is illustrated in FIGS. 7A-7C, wherein three zones 18D, 18E, 18F of the polymer matrix 18 are applied in spaced-apart strips to a panel 10" having a length L and a width W, wherein the panel 10" is to be folded about the longitudinal line 17 and consolidated as described above to form a folded, consolidated panel 28B of length L and width W/2. In the illustrated example, the zone 18C extends centrally across the length L of the panel 10" in the form of a strip having width W1, the zone 18E extends across the length L of the panel 10" adjacent to one side thereof in the form of a strip of width W2, and the zone 18F likewise extends across the length L of the panel 10" in the form of a strip of width W2 adjacent to the opposite side thereof such that none of the polymer matrix 18 covers the inner surface 12B of the fiber or fibrous substrate 12 between the zones 18D, 18E and between the zones 18D, 18F. When the panel 10" is folded about the longitudinal line 17 illustrated in FIG. 7A, the two opposing faces of the zone 18D about the longitudinal fold line 17 are brought into contact with each other as are the opposing faces of the zones 18E, 18F and, following consolidation of the panel 28B, the two halves of the zone 18D together represent a corresponding consolidated zone of width W1/2 and the two zones 18E, 18F together represent a corresponding consolidated zone of width W2 as graphically depicted in FIG. 7C by the thick section lines representing the polymer matrix 18. Between the zones 18D, 18E, 18F the fiber or fibrous substrate 12 is not consolidated, and the two opposing inner surfaces of the fiber or fibrous substrate 12 between such zones 18D, 18E and 18D, 18F are not otherwise affixed or otherwise secured to each other. Additionally, whereas the areas of the folded, consolidated panel 28B defined by the zones 18D and by the zones 18E, 18F are rigid or at least semi-rigid along the length of the folded edge 26 and along the length of the opposite edge as a result of the cured polymer matrix 18 infused in such zones, the areas between the zones 18D and 18E, 18F retain the flexibility defined by the fiber or fibrous substrate 12.

It will be understood that the embodiments shown in FIGS. 6A-6C and 7A-7C are provided only by way of example, and should not be considered limiting in any way. In other embodiments, the polymer matrix 18 may be applied in one or more zones having one or more linear boundaries extending in any direction and/or having one or more non-linear boundaries.

Referring now to FIGS. 8A and 8B, another embodiment is shown of a folded panel 60 and resulting folded, consolidated panel 75 respectively. In the illustrated embodiment, the panel 60 illustratively includes the folded panel 10, 10', 10" as illustrated and described with respect to FIGS. 1-3, 6A-6B, 7A-7B respectively, and further includes a semi-rigid or rigid substrate 70 inserted between the opposed plies 22A, 22B of the folded panel 10, 10', 10". In the illustrated embodiment, the substrate 70 is provided in the form of a semi-rigid or rigid FRP substrate including a fiber or fibrous substrate 72 having opposed major surfaces 72A, 72B and opposed top and bottom edges 72C, 72D extending between the opposed major surfaces 72A, 72B, and a polymer matrix 18 secured to and covering each of the opposed major surfaces 72A, 72B as described above with respect to the panel 10, 10', 10". The FRP substrate 70 is illustratively inserted into the folded panel 10, 10', 10" such that the top edge 72C is aligned with the fold line 26 of the folded panel 10, 10', 10", and such that the major outer surfaces 72A, 72B face the major inner surfaces of the plies 22A, 22B respectively as shown. The apparatus and process illustrated in FIG. 4, or other suitable apparatus or process, is then illustratively used, as described above, to simultaneously consolidate together the FRP substrate 15A and the FRP substrate 70 with the polymer matrix 18 carried by each to form a single, composite, consolidated FRP substrate 76 made up of the FRP substrate 15A consolidated to form the consolidated FRP substrate 15C and the FRP substrate 70 consolidated to form a consolidated FRP substrate 74. As illustrated by the example consolidated FRP substrate 76 and resulting folded panel 75 shown in FIG. 8B, the polymer matrix 18 is infused into the fiber or fibrous substrate 12 and into the fiber or fibrous substrate 72 leaving only an interface 761 between the inner major surfaces 12B1, 12B2 of the fiber or fibrous substrate 12 and the outer major surfaces and top edge 72A, 72B, 72C respectively of the fiber or fibrous substrate 72. In some alternative embodiments, the consolidation process may leave a residual amount of the polymer matrix 18 between the inner major surfaces 12B1, 12B2 of the fiber or fibrous substrate 12 and the outer major surfaces and top edge 72A, 72B, 72C respectively of the fiber or fibrous substrate 72, and/or the polymer matrix 18 may not infuse completely into the fiber or fibrous substrate 12 and/or into the fiber or fibrous substrate 72 as illustrated by example in FIG. 5B. In any case, however, it is to be understood that the consolidation process does not bond or weld the opposing polymer matrix surfaces 18, 18B1 and 18, 18B2 together; rather, the consolidation process unitarizes the polymer matrix 18 within the consolidated FRP substrates 15C, 74 to form the single, composite, consolidated FRP substrate 76.

In some alternate embodiments, the quantity of polymer matrix 18 carried by the FRP substrate 15A may be sufficient to consolidate both the FRP substrates 15A and 70, and in such embodiments the polymer matrix 18 carried by the substrate 70 may be omitted and the substrate 70 may thus include only the fiber or fibrous substrate 72. In other alternate embodiments, the fiber or fibrous substrate 72 may be incompatible with the polymer matrix 18 such that the polymer matrix 18 may not infuse into and wet the fibers of the substrate 72, or may not do so satisfactorily, during the consolidation process. In such embodiments, the polymer matrix 18 may be replaced or augmented with a polymer matrix of a material or composition which will satisfactorily infuse into and wet the fibers of the substrate 72 during the consolidation process. It is desirable, however, for the replacement or augmenting polymer matrix to be compatible with the polymer matrix 18 carried by the FRP substrate 15A so that the polymer matrices may unify during the consolidation process to create the single, composite, consolidated FRP substrate 76 illustrated in FIG. 8B. In other alternate embodiments, the substrate 70 may be a non-fiber, non-fibrous material, e.g., polymer or polymer-based material or composite, and in such embodiments the polymer matrix 18 forms a bond with and to the outer surface of the substrate 70 during the consolidation process. In some such embodiments, the non-fiber, non-fibrous substrate 70 may include an additional film or layer on one or more sides thereof, wherein such film or layer is selected to bond to the substrate 70 and to the polymer matrix 18 or is selected to facilitate bonding or adhesion of the polymer matrix 18 to one or more outer surfaces of the substrate 70.

In the embodiment illustrated in FIGS. 8A and 8B, the folded panel 10, 10', 10" and the substrate 70 each shown as having a length, i.e., in the X-direction, a height, i.e., in the Z-direction, and a thickness, i.e., in the Y-direction. In some embodiments, the length of the substrate 70 is selected to be the same as that of the folded panel 10, 10', 10", and the height of the substrate 70 is selected to fit within the folded panel 10, 10', 10" such that the bottom edge 72D is co-planar with the co-planar edges 24A, 24B of the folded, consolidated panel 15C. In other embodiments in which the length and/or height of the folded, consolidated panel 75 is cut or trimmed to size, the corresponding lengths and/or heights of the folded panel 10, 10', 10" and the substrate 70 need not be matched as just described. In other embodiments, the length of the substrate 70 may be shorter than that of the folded panel 10, 10', 10" such that the length of the substrate 70 does not span that of the folded panel 10, 10', 10" or vice versa. Alternatively or additionally, the height of the substrate 70 may be less than the interior height of the folded panel 10, 10', 10" such that the height of the substrate 70 does not span the interior height of the folded panel 10, 10', 10" or vice versa.

Although only one substrate 70 is shown inserted between the plies 22A, 22B of the folded panel 10, 10', 10" in FIGS. 8A, 8B, it will be appreciated that any number of substrates 70 may be inserted into the folded panel 10, 10', 10" to produce a multi-layer, folded consolidated panel. As one example, two or more substrates 70 having a combined end-to-end length less than or equal to the total length of the folded panel 10, 10', 10", i.e., in the X-directly, may be positioned end-to-end in the X-direction along, or at least partially along, the length of the folded panel 10, 10', 10". Alternatively or additionally, two or more substrates 70 having a combined side-to-side height less than or equal to the total interior height of the folded panel 10, 10', 10", i.e., in the Z-directly, may be positioned side edge-to-side edge in the Z-direction along, or at least partially along, the interior height of the folded panel 10, 10', 10". Alternative or additionally still, two or more substrates may be positioned face-to-face between the plies 22A, 22B of the folded panel 10, 10', 10" to produce a resulting folded, consolidated panel having any desired thickness, i.e., in the Y-direction. Alternatively or additionally still, a substrate 70 may be provided in the form of a single substrate folded one or multiple times, e.g., accordion-folded, to produce a resulting substrate of any desired thickness prior to insertion into the folded panel 10, 10', 10".

Referring now to FIG. 8C, another alternate embodiment is illustrated in which the interior height, i.e., in the Z-direction illustrated in FIG. 8A, of folded panel 10, 10', 10" is much less than that of the substrate 70. In such embodiments, the folded panel 10, 10', 10" of the resulting folded, consolidated panel 75A acts as a folded-edge top cap to the substrate 70, and the faces of the substrate 70 below the folded panel 10, 10', 10" remain exposed after the consolidation process. In some such embodiments in which the polymer matrix 18 is applied to the opposed faces of the substrate 70, such polymer matrix 18 is illustratively applied only to those portions of the opposed faces of the substrate 70 which contact the interior faces 12B1, 12B2 of the folded panel 10, 10', 10". In such embodiments, the consolidation portion of 74A of the substrate 70 is confined to a corresponding upper portion of the substrate 70 as illustrated in FIG. 8C.

Referring to FIG. 8D, yet another alternate embodiment is illustrated in which the folded panel 10, 10', 10" is provided in the form of two folded panel 10A, 10B each having an interior height, i.e., in the Z-direction as illustrated in FIG. 8A, which is in sum equal to the total height of the substrate 70. In the illustrated embodiment, the folded panel 10A is positioned over the top of the substrate 70 and the folded panel 10B is positioned under the bottom of the substrate 70 such that the free ends 24A, 24B of the two folded panels 10A, 10B abut one another as shown. Alternatively, either or both of the free ends of the two folded panels 10A, 10B may be spaced apart from one another. In any case, consolidation of the substrate 70 and the two folded panels 10A, 10B results in a folded, consolidated panel 75B having folded, continuous surface 26A at and along the top edge thereof and a folded, continuous surface 26B at and along the bottom edge thereof.

Referring now to FIGS. 9A and 9B, yet another embodiment is shown of a folded panel 80 and resulting folded, consolidated panel 95 respectively. In the illustrated embodiment, the folded panel 80 illustratively includes the folded panel 10, 10', 10" as illustrated and described with respect to FIGS. 1-3, 6A-6B and 7A-7B respectively, and further includes a semi-rigid or rigid fiber-reinforced substrate 90 inserted between the opposed plies 22A, 22B of the folded panel 10, 10', 10". In the illustrated embodiment, the substrate 90 is provided in the form of a semi-rigid or rigid substrate made up of a plurality of oriented fibers 92 embedded or encased in a polymer matrix 94. The resulting substrate 90 has opposed major surfaces 90A, 90B respectively, and opposed top and bottom edges 90C, 90D extending between the major surfaces 90A, 90B. In the illustrated embodiment, the fibers 92 are oriented so as to run parallel with the fold line 20, although in other embodiments the fibers 92 may be oriented to run perpendicularly to the fold line 20 or in some other direction relative to the fold line 20. In still other embodiments, the substrate 90 may include two or more side-by-side sets of fibers 92 all running in the same direction or some running in directions differently than others, and in still further embodiments the substrate 90 may include two more inter-woven sets of fibers, with at least one such set of fibers running in a different direction, and inter-woven with, one or more other sets of fibers. In any case, the fibers 92 may illustratively be formed of conventional materials, examples of which include, but are not limited to, glass, carbon, nylon, basalt, aramid, cellulose, and the like. In some embodiments, one or more fibers 92 may be formed of one such material, and others of the fibers 92 may be formed of one or more other such materials.

In some embodiments, the polymer matrix 94 may be or include the same polymer used to form the polymer matrix 18 carried by the FRP substrate 15A, although in alternate embodiments the polymer matrix 94 may be different from the polymer matrix 18. In any case, the substrate 90 is illustratively inserted into the folded panel 10 such that the top edge 90C is aligned with and adjacent to the fold line 20 of the folded panel 10, and such that the major outer surfaces 90A, 90B face the major inner surfaces 18B1, 18B2 of the plies 22A, 22B respectively as shown. The apparatus and process illustrated in FIG. 4 is then illustratively used, as described above, to simultaneously consolidate together the FRP substrate 15A and the substrate 90 to form a single, composite, consolidated FRP substrate 96 made up of the FRP substrate 15A consolidated to form the consolidated FRP substrate 15C and the fiber-reinforced substrate 90. As illustrated by the example consolidated FRP substrate 96 and resulting folded panel 95 shown in FIG. 9B, the polymer matrix 18 and the polymer matrix 94 are together completely infused into the fiber or fibrous substrate 12 leaving only an interface 96I between the exterior-facing surfaces of the oriented fibers 92. It is to be understood that the consolidation process does not bond or weld together the opposing polymer matrix surfaces 18B1, 18B2 and 94; rather, the consolidation process unitarizes the polymer matrices 18 and 94 within the consolidated FRP substrate 15C and the oriented fibers 92 to form the single, composite, consolidated FRP substrate 96.

Although only one substrate 90 is shown inserted between the plies 22A, 22B of the folded panel 10, 10', 10" in FIGS. 9A and 9B, it will be understood that any number of substrates 90, with aligned fibers 92, may be inserted into the folded panel 10, 10', 10" end-to-end, side edge-to-side edge and/or side-by-side facing each other to produce a multi-layer folded panel. Alternatively or additionally, one or more of the fiber or fibrous substrates 70 illustrated in FIGS. 8A and 8B may be inserted end-to-end, side edge-to-side edge and/or side-by-side facing the one or more substrates 90 in the folded panel 10, 10', 10", and all such layers may then be consolidated together as described above. In still other embodiments, the length of the substrate 90 may be shorter than that of the folded panel 10, 10', 10" such that the length of the substrate 90 does not span that of the folded panel 10, 10', 10" or vice versa. Alternatively or additionally, the height of the substrate 90 may be less than the interior height of the folded panel 10, 10', 10" such that the height of the substrate 90 does not span the interior height of the folded panel 10, 10', 10" or vice versa.

Figure 10:
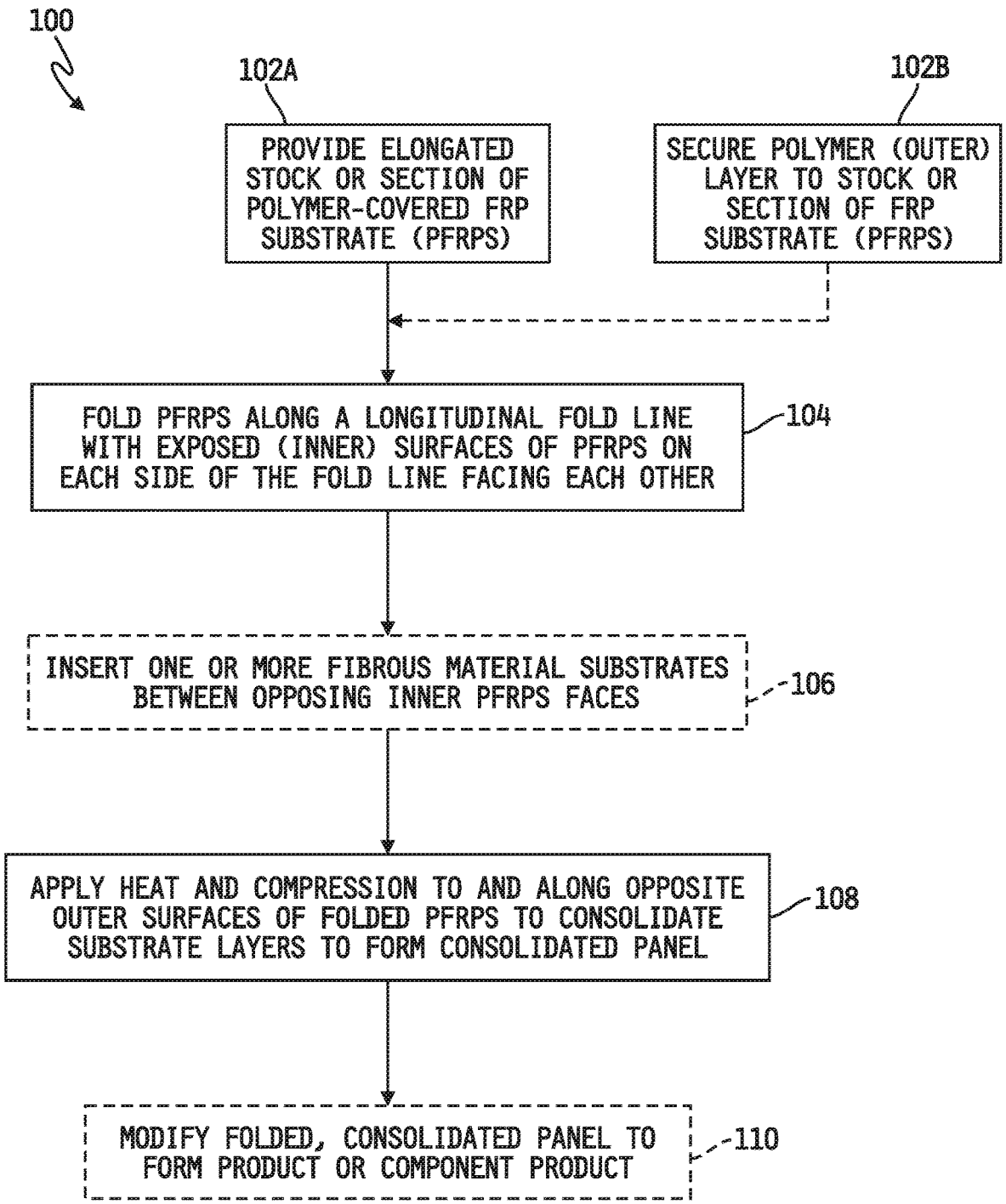
FIG. 10 is a simplified flow chart illustrating an embodiment of a process for forming any of the folded panels illustrated in FIGS. 1-9B.

Referring now to FIG. 10, a simplified flowchart is shown of a process 100 for making any of the folded, consolidated panels illustrated in FIGS. 1-9B. Those skilled in the art will recognize that the illustrated steps of the process 100 need not proceed in the order shown, and/or that some steps may be combined with other steps. It will be understood that all such deviations from the process 100 illustrated in FIG. 10 are contemplated by this disclosure.

In one embodiment of the process 100 illustrated in FIG. 10, the process 100 illustratively begins at step 102A where an elongated (or other) stock or section of polymer-covered (14) FRP substrate (PFRPS) is provided. In some alternate embodiments, the process 100 may begin at step 102B where an outer polymer layer (14) is secured to an elongated stock or section of FRP substrate to form the PFRPS as part of the process 100. In either case, the process 100 advances from step 102A or step 1028 to step 104 where the PFRPS is folded along a longitudinal fold line (20) with the exposed inner surfaces of the PFRPS on each side of the fold line 20 facing each other. An optional step 106 follows step 104, as shown by dashed-line representation, and at optional step 106 one or more stiffening and/or strengthening substrates are inserted between opposing PFRPS faces. Following step 106 in embodiments which include step 106, or following step 104 in embodiments that don't include step 106, the process 100 advances to step 108 where energy from an external source, e.g., in the form of heat and compression, are applied to and along opposite outer surfaces of the folded PFRPS to form a folded, consolidated panel. Following step 108, the folded, consolidated panel is in its present form provided as usable product or as a component product of a larger assembly. Alternatively or additionally, the process 100 may include an optional step 110 in which the folded, consolidated panel is modified to form a usable product or a component product of a larger assembly. As one example, the folded, consolidated panel may be modified at step 110 for use as a slotted partition by forming one or more slots into the top and/or bottom surface thereof and/or cutting the panel to size. Alternatively or additionally, the folded, consolidated panel may be modified at step 110 to form one or more thumb tabs therein. Those skilled in the art will recognize other products for which the folded, consolidated panel may have utility and/or assemblies in which the folded, consolidated product may be used, and/or other modifications that may be made to the folded, consolidated product to form a product or product component that may be used in a larger assembly, and it will be understood that any such other products, modifications and/or assemblies are contemplated by this disclosure.

To form the folded, consolidated panel 28 illustrated in FIGS. 5A and 5B and/or the folded, consolidated panel 28' illustrated in FIG. 5C, steps 102A or 102B, 104 and 108 of the process 100 are executed. Optionally, step 110 may be executed to modify the folded, consolidated panel 28, 28' to form a product or a component product of a larger assembly. To form any of the folded, consolidated panels 75, 75A, 75B illustrated in FIGS. 8B-8D respectively, steps 102A or 102B, 104, 106 and 108 are executed, wherein at step 106 the one or more stiffening and/or strengthening substrates include the substrate 70. Optionally, step 110 may be executed to modify the folded, consolidated panel 75, 75A, 75B to form a product or a component product of a larger assembly. To form the folded panel 95 illustrated in FIG. 9B, steps 102A or 102B, 104, 106 and 108 are executed, wherein at step 106 the one or more stiffening and/or strengthening substrates include the substrate 90. Optionally, step 110 may be executed to modify the folded, consolidated panel 95 to form a product or a component product of a larger assembly. In any of the folded panel forming processes just described, optional step 106 alternatively or additionally include insertion of multiple substrates 70 and/or 90 as described above.

Figure 11:
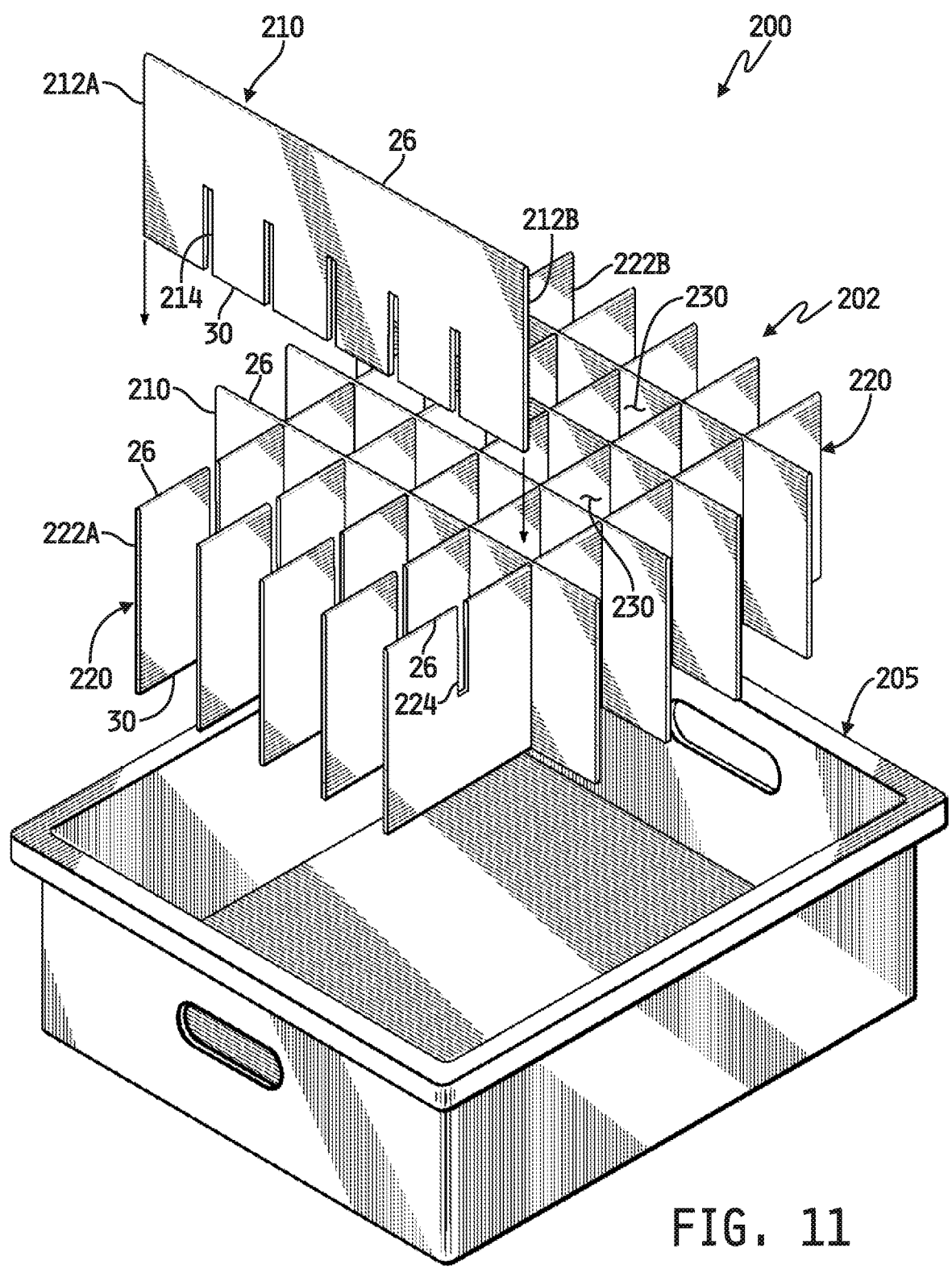
FIG. 11 is a simplified perspective and partial assembly view of an embodiment of a partition assembly insertable into a container and constructed using at least one or any combination of the folded panels illustrated in FIGS. 1-9B.

Referring now to FIG. 11, a partitioned structure 200 is shown including a partition assembly 202 for dividing the space inside a container 205. Although one type or configuration of container 205 is illustrated in FIG. 9, it will be understood that the partition assembly 202 may be used or adapted for use with any type of container or box. The partition assembly 202 is illustrated as being constructed from the folding panels of the type illustrated in FIGS. 5A-5C, 6B-6C and 7B-7C, although it will be understood that the partition assembly 202 may alternatively be constructed from, or may include, at least one of or any combination of the folded panels illustrated in FIGS. 5A-5C, 6B-6C, 7B-7C, 8A-8D and 9A-9B and/or at least one conventional partition along with at least one of or any combination of the folded panels illustrated in FIGS. 5A-5C, 6B-6C, 7B-7C, 8A-8D and 9A-9B. In any case, as illustrated in FIG. 11, the partition assembly 202 includes a plurality of parallel first slotted partitions 210 intersecting with a plurality of parallel second slotted partitions 220.

As shown in FIG. 11, and as described above and illustrated in FIGS. 1-10, each first slotted partition 210 has a folded upper or top edge 26, a planar bottom edge 30 and two opposed side edges 212A, 212B. Likewise each second slotted partition 220 has a folded upper or top edge 26, a planar bottom edge 30 and two opposed side edges 222A, 222B. Each first slotted partition 210 has at least one slot 214 which extends upwardly from the bottom edge 30 thereof toward the top edge 26 to approximately the midpoint of the first slotted partition 210. The slots 214 may be evenly spaced apart in order that the individual holding cells 230 of the partition assembly 202 formed by the slotted partitions 210, 212 may be evenly sized. Alternatively, the slots 214 of the first slotted partitions 210 may be unevenly spaced in order to form holding cells 230 of the partition assembly 202 of differing sizes to accept different sized parts. The slots 214 are shown as being vertical but may be horizontal if the partition assembly 202 is placed on edge. Each second slotted partition 220 has at least one slot 224 extending downwardly from the top edge 26 thereof toward the bottom edge 30 to approximately the midpoint of the second slotted partition 220. The slots 224 of the second slotted partitions 220 may also be evenly spaced so that the holding cells 230 formed by the partition assembly 202 may be evenly sized. Alternatively, the slots 224 may be unevenly spaced so as to form holding cells 230 of the partition assembly 202 of differing sizes adapted to accept different sized parts. The slots 224 are shown as being vertical but may be horizontal if the partition assembly 202 is placed on edge. In some alternate embodiments, at least one of the mating pairs of slots 214, 224 defines in at least one set partitions 210, 220 may be formed to extend into opposite edges 26, 30 than those illustrated in FIG. 11. As one example, the mating pairs of slots 214, 224 at the ends of one or more sets of partitions 210, 220 may be formed to extend into opposite edges 26, 30 than those illustrated so as to lock together at least some of the partitions 210, 220 of the partition assembly 202.

Figure 12:
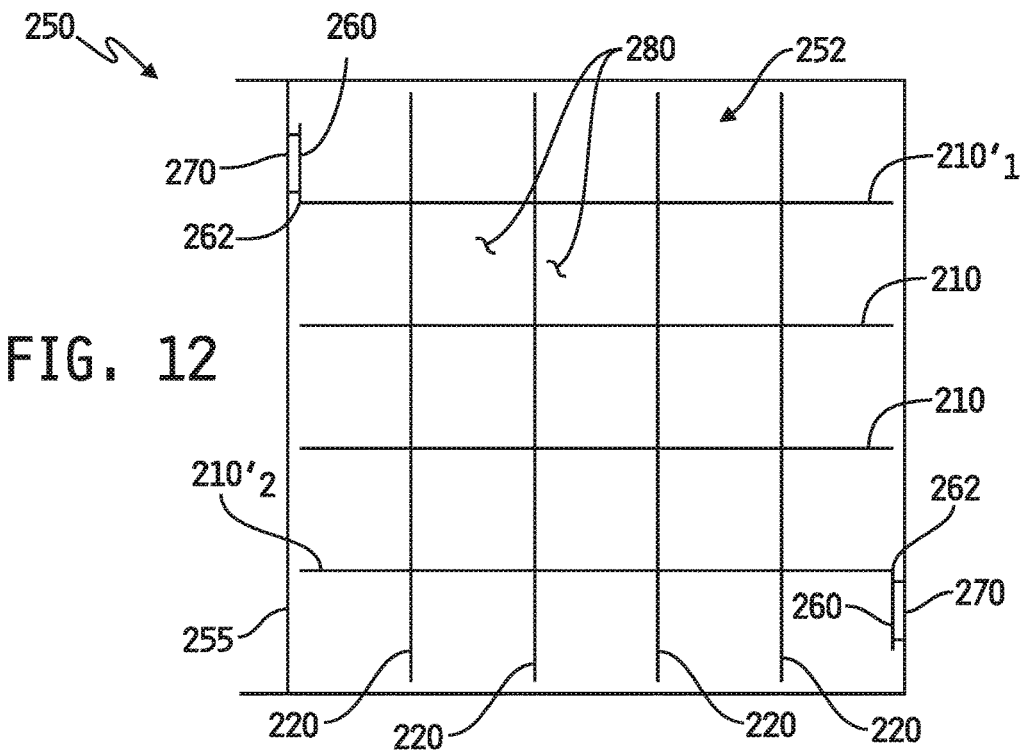
FIG. 12 is a simplified top plan view illustrating another embodiment of a partition assembly constructed using at least one or any combination of the folded panels illustrated in FIGS. 1-9B and shown secured to and within a container.

Referring now to FIG. 12, an alternate a partitioned structure 250 is shown including a partition assembly 252 for dividing the space inside a container 255 into holding cells 280. The partition assembly 252 is identical in many respects to the partition assembly 202 illustrated in FIG. 9, and like the partition assembly 202 the partition assembly 252 includes 5 first slotted partitions and 5 second slotted partitions. The partition assembly 252 differs from the partition assembly 202 in that the first slotted partitions 210'$_1$ and 210'$_2$ at either end of the partition assembly 252 include a flap 260 and a fold line 262 between the flap 260 and the remainder of the slotted partitions 210'$_1$, 210'$_2$. The flaps 260 are illustratively foldable along the fold lines 262 as shown and are configured to be attached to opposing sidewalls of the container 255 via a conventional attachment medium, e.g., adhesive, or mechanical fastener(s) 270.

Figure 13A:
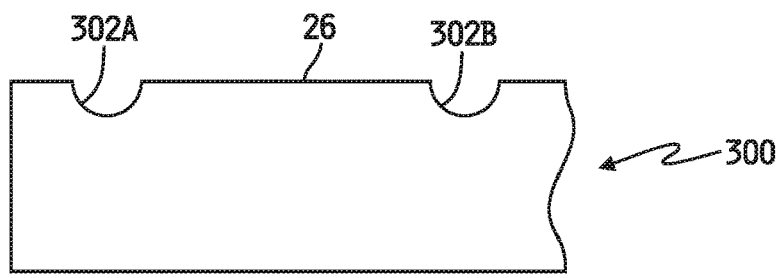
FIG. 13A is a simplified side elevational view of an embodiment of any of the folded panels illustrated in FIGS. 1-9B shown with one configuration of spaced apart thumb tabs extending into the folded top edge thereof.

Referring now to FIG. 13A, an embodiment of a folded, consolidated panel 300 is shown which may be any of the folded, consolidated panels illustrated in FIGS. 5A-5C, 6B-6C, 7B-7C, 8A-8D and 9A-9B. In the illustrated embodiment, two example, spaced apart thumb tabs 302A, 302B are shown extending from the folded top edge 26 thereof downwardly toward the bottom edge thereof, although it will be understood that alternate embodiments may include more or fewer such thumb tabs extending into the folded top edge 26 and/or any other edge of the panel 300. It will be appreciated that any such thumb tabs may have any desired dimensions, and that one or more such thumb tabs may have different dimensions than others. In some embodiments, the thumb tabs 302A, 302B may be formed in a conventional manner prior to folding and consolidation of the panel 300, after folding but prior to consolidation of the panel 300 or after folding and consolidation of the panel 300. It will be appreciated that while the panel 300 illustrated in FIG. 13A is not depicted as having any slots or apertures formed therein, one or more such slots and/or apertures may alternatively be formed to extend into any edge of the panel 300 and/or to extend through the panel 300.

Figure 13B:
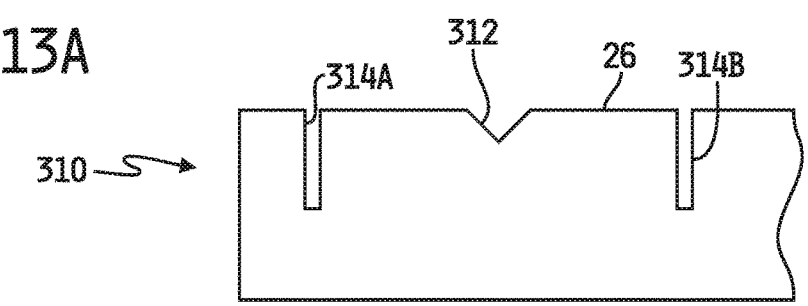
FIG. 13B is a simplified side elevational view of another embodiment of any of the folded panels illustrated in FIGS. 1-9B shown with another configuration of a thumb tab and spaced apart slots extending into the folded top edge thereof.

Referring now to FIG. 13B, another embodiment of a folded, consolidated panel 310 is shown which may be any of the folded, consolidated panels illustrated in FIGS. 5A-5C, 6B-6C, 7B-7C, 8A-8D and 9A-9B. In the illustrated embodiment, an example thumb tab 312 of alternate configuration is shown extending from the folded top edge 26 thereof downwardly toward the bottom edge thereof, although it will be understood that alternate embodiments may include more such thumb tabs 312 extending into the folded top edge 26 and/or any other edge of the panel 310. It will be appreciated that any one or more such thumb tabs may have any desired dimensions, and that in embodiments having multiple thumb tabs one or more such thumb tabs may have different dimensions than others. In some embodiments, the thumb tab(s) 312 may be formed in a conventional manner prior to folding and consolidation of the panel 310, after folding but prior to consolidation of the panel 310 or after folding and consolidation of the panel 310. Also illustrated in FIG. 13B are two spaced apart slots 314A, 314B positioned on either side of the thumb tab 312 and extending from the folded top edge 26 of the panel 310 downwardly toward the bottom edge thereof. It will be appreciated that alternate embodiments may not include any such slots or may include one or more such slots and/or apertures formed anywhere in, along and/or through the panel 310, e.g., such as one or more slots extending only from the bottom edge of the panel 310 upwardly toward the top edge 26, or such as one or more slots extending from the top edge 26 of the panel 310 toward the bottom edge and one or more slots extending from the bottom edge of the panel toward the top edge 26.

Figure 13C:
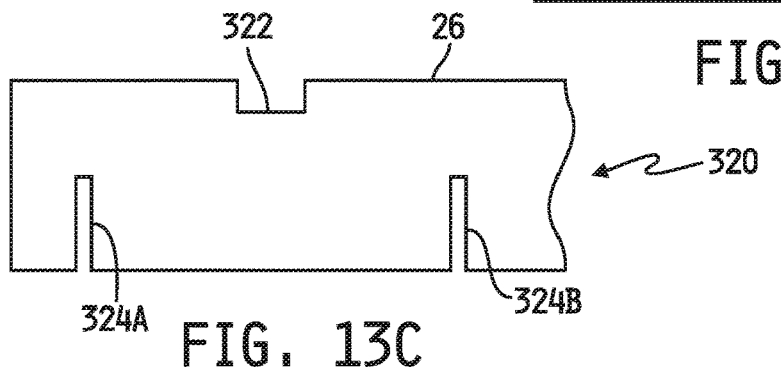
FIG. 13C is a simplified side elevational view of yet another embodiment of any of the folded panels illustrated in FIGS. 1-9B shown with yet another configuration of a thumb tab extending into the folded top edge thereof and spaced apart slots extending into the bottom edge thereof.

Referring now to FIG. 13C, yet another embodiment of a folded, consolidated panel 320 is shown which may be any of the folded, consolidated panels illustrated in FIGS. 5A-5C, 6B-6C, 7B-7C, 8A-8D and 9A-9B. In the illustrated embodiment, another example thumb tab 322 of alternate configuration is shown extending from the folded top edge 26 thereof downwardly toward the bottom edge thereof, although it will be understood that alternate embodiments may include more such thumb tabs 322 extending into the folded top edge 26 and/or any other edge of the panel 320. It will be appreciated that any one or more such thumb tabs may have any desired dimensions, and that in embodiments having multiple thumb tabs one or more such thumb tabs may have different dimensions than others. In some embodiments, the thumb tab(s) 322 may be formed in a conventional manner prior to folding and consolidation of the panel 320, after folding but prior to consolidation of the panel 320 or after folding and consolidation of the panel 320. Also illustrated in FIG. 13C are two spaced apart slots 324A, 324B positioned on either side of the thumb tab 322 and extending from the bottom edge of the panel 320 upwardly toward the folded top edge 26 thereof. It will be appreciated that alternate embodiments may not include any such slots or may include one or more such slots and/or apertures formed anywhere in, along and/or through the panel 320, e.g., such as one or more slots extending only from the top edge 26 of the panel 320 downwardly toward the bottom edge, or such as one or more slots extending from the top edge 26 of the panel 310 toward the bottom edge and one or more slots extending from the bottom edge of the panel toward the top edge 26. It will be further appreciated that any of the folded, consolidated panels 300, 310, 320 in which more than one thumb tab is formed may include one or any combination of the thumb tabs 302A/302B, 312 and 322 illustrated in FIGS. 13A-13C.

Figure 14:
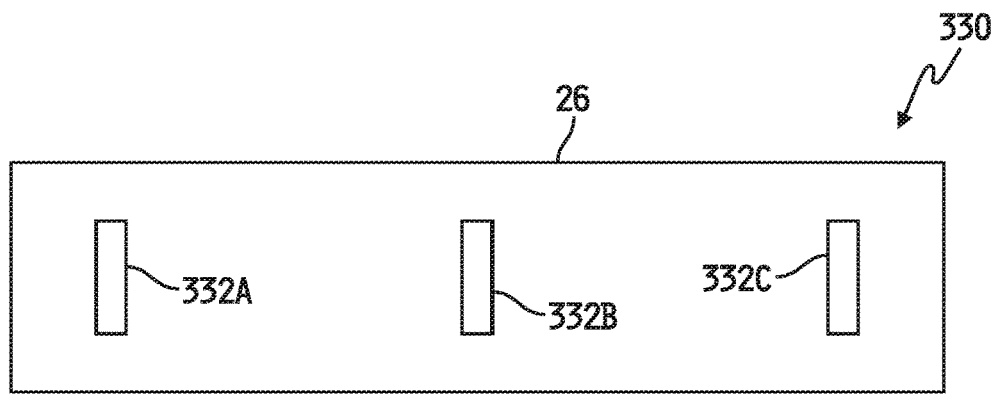
FIG. 14 is a simplified side elevational view of an embodiment of any of the folded panels illustrated in FIGS. 1-9B shown with one configuration of spaced apart apertures extending therethrough between the folded top edge and the bottom edge thereof.

Referring now to FIG. 14, a further embodiment of a folded, consolidated panel 330 is shown which may be any of the folded, consolidated panels illustrated in FIGS. 5A-5C, 6B-6C, 7B-7C, 8A-8D and 9A-9B. In the illustrated embodiment, three example spaced apart apertures 332A, 332B, 332C are shown extending transversely through the body of the panel 330 between the folded top edge 26 and the bottom edge thereof, although it will be understood that alternate embodiments may include more or fewer such apertures. It will be appreciated that any such apertures may have any desired dimensions, and that one or more such apertures may have different dimensions than others. In some embodiments, the apertures 322A, 322B, 322C may be formed in a conventional manner prior to folding and consolidation of the panel 330, after folding but prior to consolidation of the panel 330 or after folding and consolidation of the panel 330. It will be appreciated that while the panel 330 illustrated in FIG. 14 is not depicted as having any slots or thumb tabs formed therein, one or more such slots and/or thumb tabs may alternatively be formed anywhere in, along and/or through the panel 330.

Figure 15A:
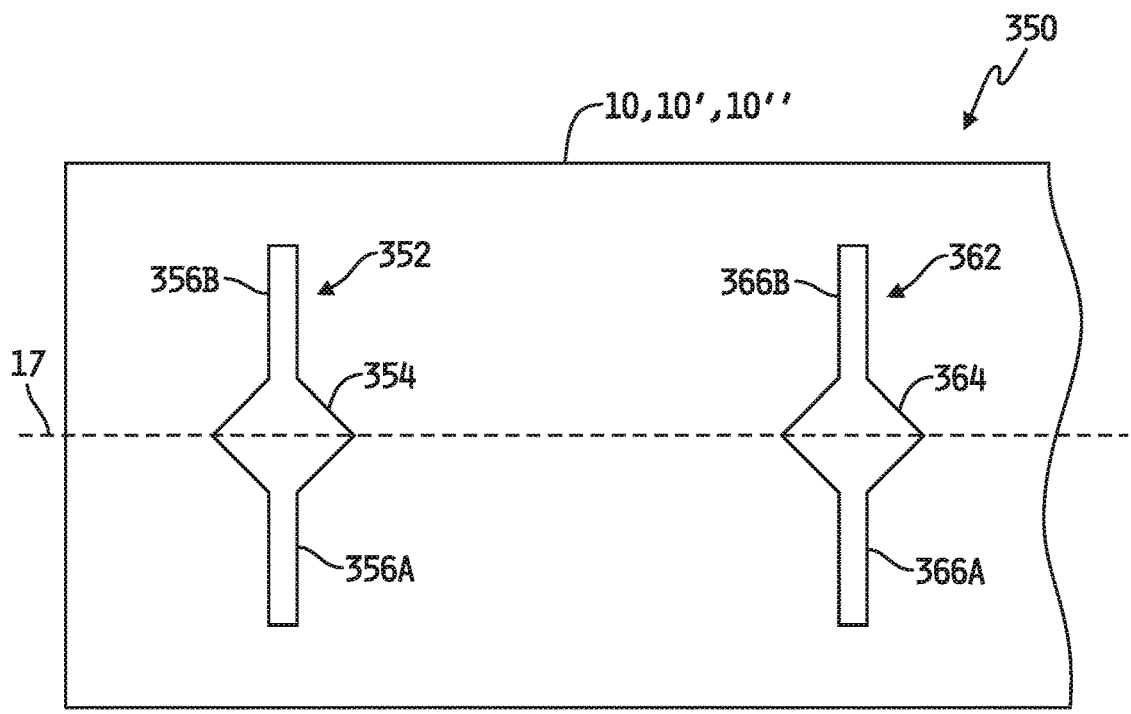
FIG. 15A is a simplified top plan view of a portion of any of the panels illustrated in FIGS. 1-9B shown prior to folding and consolidation thereof and shown with a spaced apart combination of thumb tabs and slots formed therein.

Referring now to FIG. 15A, an embodiment of a panel 350 is shown which may be any of the panels 10, 10', 10" illustrated in FIGS. 1-3, 6A and 7A. Overlaid onto the illustrated panel 350 is a longitudinal dashed line 17 which represents an imaginary fold line about which the panel 350 will be folded prior to consolidation thereof. In the illustrated embodiment, two example spaced apart passageways 352, 362 are shown extending transversely through the body of the panel 350 between the top and bottom edges thereof. The passageway 352 illustratively defines a square or diamond shaped aperture 354 with the longitudinal fold line 17 passing through two opposing corners thereof, and slots 356A, 356B extending transversely away from the remaining opposite corners. Spaced apart longitudinally from the passageway 352, the passageway 362 likewise defines a square or diamond shaped aperture 364 with the longitudinal fold line 17 passing through two opposing corners thereof, and slots 366A, 366B extending transversely away from the remaining opposite corners. It will be appreciated that the apertures 352, 362 may be formed in a single step or multiple steps in any conventional manner.

Figure 15B:
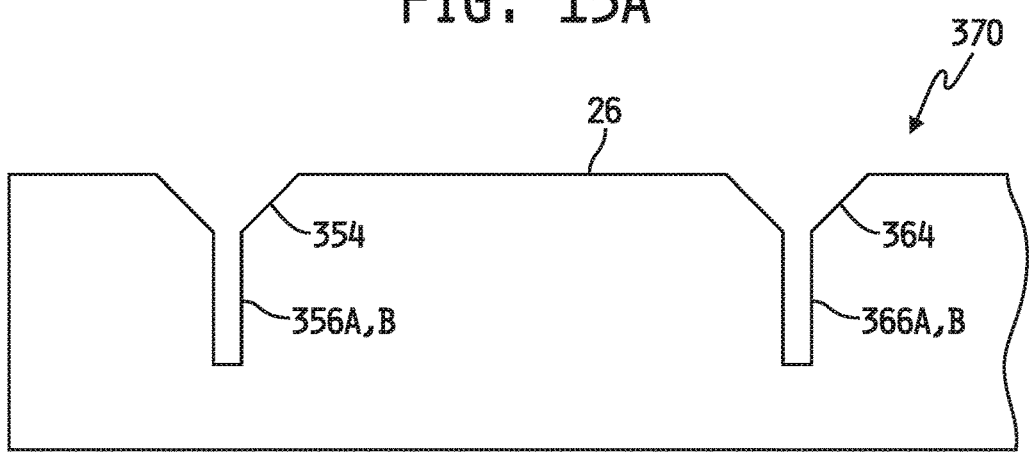
FIG. 15B is a simplified side elevational view of the panel illustrated in FIG. 15A shown after folding and consolidation thereof.

When the panel 350 is folded about the longitudinal line 17, the opposing areas of the aperture 354, 364 on either side of the fold line 17 illustratively form truncated conical thumb tabs 354, 364 as illustrated by example in FIG. 15B. Extending downwardly from the truncated thumb tab 354, the opposed slots 356A, 356B align to form a slot 356A,B transversely through the folded panel, and the opposed slots 366A, 366B likewise align to form a slot 366A,B extending downwardly from the truncated thumb tab 364 and transversely through the panel. The folded panel is illustratively consolidated, e.g., as described above, to form a folded, consolidated panel 370 with preformed and aligned thumb tabs 354, 364 and slots 356A,B, 366A,B extending downwardly therefrom. It will be appreciated that the thumb tabs 354, 364 may be sized to have any desired dimensions and/or configured to have any desired alternate shape, and the slots 356A,B and 366A,B may likewise be sized to have any desired dimensions and/or configured to have any desired alternate shape. In alternate embodiments, one or more additional slots may be formed to extend from the bottom edge of the panel 370 toward the top edge 26.

It will be understood that any partition assembly, such as either or both of the partition assemblies 220 and 252 illustrated in FIGS. 11 and 12 respectively, constructed using one or more of any of the folded, consolidated panels illustrated in FIGS. 5A-5C, 6B-6C, 7B-7C, 8A-8D and 9A-9B may be modified as shown in any of FIGS. 13A-15B to include any combination of the features illustrated therein. It will be further understood that any such partition assembly may use different variant combinations of any such folded, consolidated panels, where examples of such variations may include, but are not limited to, any combination of folded, consolidated panels of different dimensions, folded, consolidated panels of different material construction, folded, consolidated panels of different thickness, folded, consolidated panels of different stiffness, folded, consolidated panels of different density, folded, consolidated panels of different three-dimensional configuration, e.g., different combined linear and/or non-linear, and the like.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. As one example, the panels illustrated in the attached figures have been described as being folded so as to result in the outer major surface 14A of the outer layer or skin 14 forming a "folded edge" 26 at the fold line 20 that is continuous with the portion 14A1 of the outer surface 14A of the outer layer or skin 14 secured to and covering the portion 12A1 of the outer surface 12A of the fiber or fibrous substrate 12 which forms the ply 22A, and that is also continuous with the portion 14A2 of the outer surface 14A of the outer layer or skin 14 secured to and covering the portion 12A2 of the outer surface 12A of the fiber or fibrous substrate 12 which forms ply 22B. In some implementations, such as illustrated by example in FIGS. 4-5C, 6B, 7B-7C, 8B-8D and 9B this "folded edge" may result in a generally rounded edge, e.g., such as a so-called full bullnose edge. In other embodiments, depending upon the thickness(es) of the outer layer or skin 14 and/or of the fiber or fibrous substrate 12, and/or depending upon the profile and/or thickness of one or more substrates inserted between the plies 22A, 22B prior to consolidation, the "folded edge" may include or define two or more distinguishable edges. Examples of profiles or shapes of folded edges that include or define two or more distinguishable edges may include, but are not limited to eased edges, rounded top and bottom edges, squared edges, beveled edges, and edges with any other conceivable two or more edged profile.

What is claimed is:

1. A method of forming a folded panel, the method comprising:
   one of
   (a) forming a multi-layer panel by securing an outer layer to a first major surface of a fiber-reinforced polymer (FRP) substrate having a second major surface opposite the first major surface with a polymer matrix at least partially covering the second major surface, and
   (b) providing the multi-layer panel with the outer layer secured to and covering the first major surface and with the polymer matrix at least partially covering the second major surface of the FRP substrate,
   folding the multi-layer panel about a fold line to create opposed plies on either side of the fold line with the polymer matrix of one of the opposed plies contacting the polymer matrix of the other of the opposed plies and with the outer layer forming a folded edge at the fold line that is continuous with the outer layer covering the opposed plies, and
   consolidating the FRP substrate of the folded panel to form a folded, consolidated panel,
   wherein the polymer matrix has an activation temperature at which the polymer matrix is activated and the outer layer comprises an outer polymer layer having a melting temperature that is higher than the activation temperature,
   and wherein consolidating comprises heating the outer layer of at least one of the opposed plies to a first temperature, greater than or equal to the activation temperature but less than the melting temperature, to activate the polymer matrix covering each of the opposed plies.

2. The method of claim 1, wherein the consolidating step comprises:
   positioning the folded panel between opposed press members with one of the opposed press members in contact with the outer layer of one of the opposed plies and the other of the opposed press members in contact with the outer layer of the other of the opposed plies, and
   moving at least one of the opposed press members toward the other to compress the folded panel therebetween.

3. The method of claim 2, wherein at least one of the opposed press members comprises at least one heating element,
   and wherein the consolidating step further comprises controlling, with a controller, the at least one heating element to heat the outer layer of at the least one of the opposed plies to the first temperature.

4. The method of claim 1, wherein the consolidating step comprises:
   positioning the folded panel between opposed press members with one of the opposed press members in contact with the outer layer of one of the opposed plies and the other of the opposed press members in contact with the outer layer of the other of the opposed plies, wherein at least one of the opposed press members comprises at least one heating element,
   controlling, with a controller, the at least one heating element to heat the outer layer of at the least one of the opposed plies to the first temperature, and
   moving at least one of the opposed press members toward the other to compress the folded panel therebetween with a pressure which causes the activated polymer matrix to infuse into the FRP substrate and wet fibers contained in the FRP substrate.

5. The method of claim 1, further comprising forming at least one slot in one of the panel, the folded panel and the folded, consolidated panel that extends inwardly from one of the folded edge and an opposite edge of the folded, consolidated pane toward the other of the folded edge and the opposite edge of the folded, consolidated panel.

6. The method of claim 1, further comprising forming a plurality of spaced-apart slots in one of the panel, the folded panel and the folded, consolidated panel with each slot extending inwardly from one of the folded edge and an opposite edge of the folded, consolidate panel toward the other of the folded edge and the opposite edge of the folded, consolidated panel.

* * * * *

UNITED STATES PATENT AND TRADEMARK OFFICE
CERTIFICATE OF CORRECTION

| | |
|---|---|
| PATENT NO. | : 10,843,433 B2 |
| APPLICATION NO. | : 16/136919 |
| DATED | : November 24, 2020 |
| INVENTOR(S) | : Calvin D. Nyeboer |

Page 1 of 1

It is certified that error appears in the above-identified patent and that said Letters Patent is hereby corrected as shown below:

In the Specification

Column 20, Lines 19-39, replace with the following corrected paragraph:
Referring now to FIG. 14, a further embodiment of a folded, consolidated panel 330 is shown which may be any of the folded, consolidated panels illustrated in FIGS. 5A – 5C, 6B – 6C, 7B – 7C, 8A – 8D and 9A – 9B. In the illustrated embodiment, three example spaced apart apertures 332A, 332B, 332C are shown extending transversely through the body of the panel 330 between the folded top edge 26 and the bottom edge thereof, although it will be understood that alternate embodiments may include more or fewer such apertures. It will be appreciated that any such apertures may have any desired dimensions, and that one or more such apertures may have different dimensions than others. In some embodiments, the apertures 332A, 332B, 332C may be formed in a conventional manner prior to folding and consolidation of the panel 330, after folding but prior to consolidation of the panel 330 or after folding and consolidation of the panel 330. It will be appreciated that while the panel 330 illustrated in FIG. 14 is not depicted as having any slots or thumb tabs formed therein, one or more such slots and/or thumb tabs may alternatively be formed anywhere in, along and/or through the panel 330.

Signed and Sealed this
Twelfth Day of January, 2021

Andrei Iancu
*Director of the United States Patent and Trademark Office*